(12) United States Patent
Song et al.

(10) Patent No.: US 12,457,882 B2
(45) Date of Patent: Oct. 28, 2025

(54) DISPLAY DEVICE INCLUDING LIGHT RECEIVING ELEMENT

(71) Applicant: SAMSUNG DISPLAY CO., LTD., Yongin-si (KR)

(72) Inventors: Heerim Song, Yongin-si (KR); Heejean Park, Yongin-si (KR); Yujin Lee, Yongin-si (KR); Cheol-Gon Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 99 days.

(21) Appl. No.: 18/177,067

(22) Filed: Mar. 1, 2023

(65) Prior Publication Data

US 2023/0363239 A1 Nov. 9, 2023

(30) Foreign Application Priority Data

May 9, 2022 (KR) .................. 10-2022-0056439

(51) Int. Cl.
*H10K 59/65* (2023.01)
*G06F 3/041* (2006.01)
*G06V 40/13* (2022.01)
*H10K 59/121* (2023.01)
*H10K 59/123* (2023.01)
(Continued)

(52) U.S. Cl.
CPC ........... *H10K 59/65* (2023.02); *G06F 3/0412* (2013.01); *G06V 40/1318* (2022.01); *H10K 59/121* (2023.02); *H10K 59/1213* (2023.02); *H10K 59/123* (2023.02); *H10K 59/131* (2023.02); *H10K 59/352* (2023.02); *H10K 59/353* (2023.02); *H10K 59/40* (2023.02); (Continued)

(58) Field of Classification Search
CPC ............. G06F 3/0412; G06V 40/1318; H10K 59/121; H10K 59/12113; H10K 59/123; H10K 59/131; H10K 59/352; H10K 59/353; H10K 59/40; H10K 59/50; H10K 59/60; H10K 59/65; H10K 59/88
See application file for complete search history.

(56) References Cited

U.S. PATENT DOCUMENTS 9,466,652 B2 10/2016 Kim
9,953,572 B2 4/2018 Fujita
(Continued)

FOREIGN PATENT DOCUMENTS

KR 10-1801214 9/2018
KR 10-1901214 9/2018
(Continued)

*Primary Examiner* — Cory A Almeida
(74) *Attorney, Agent, or Firm* — F. CHAU & ASSOCIATES, LLC

(57) ABSTRACT

A display device includes a light emitting element, a pixel circuit disposed below the light emitting element and electrically connected to the light emitting element, a first light receiving element disposed adjacent to the light emitting element, a sensing circuit disposed below the first light receiving element and electrically connected to the first light receiving element, a second light receiving element spaced apart from the first light receiving element and electrically connected to the sensing circuit and adjacent to the light emitting element, and a dummy circuit pattern disposed below the second light receiving element.

20 Claims, 23 Drawing Sheets

(51) Int. Cl.
*H10K 59/131* (2023.01)
*H10K 59/35* (2023.01)
*H10K 59/40* (2023.01)
*H10K 59/50* (2023.01)
*H10K 59/60* (2023.01)
*H10K 59/88* (2023.01)

(52) U.S. Cl.
CPC ............ *H10K 59/50* (2023.02); *H10K 59/60* (2023.02); *H10K 59/88* (2023.02)

(56) References Cited

U.S. PATENT DOCUMENTS

| | | | |
|---|---|---|---|
| 10,860,135 B2 | 12/2020 | Yoo et al. | |
| 2018/0357460 A1* | 12/2018 | Smith | G02B 5/3025 |
| 2020/0210043 A1* | 7/2020 | Yoo | G06F 3/0412 |
| 2021/0200366 A1* | 7/2021 | Bok | G06V 10/17 |
| 2023/0089207 A1* | 3/2023 | Lee | G06V 40/1318 |
| | | | 345/211 |

FOREIGN PATENT DOCUMENTS

| | | |
|---|---|---|
| KR | 10-2038078 | 10/2019 |
| KR | 10-2020-008250 | 7/2020 |
| KR | 10-2020-0082509 | 7/2020 |

\* cited by examiner

DISPLAY DEVICE INCLUDING LIGHT RECEIVING ELEMENT

CROSS-REFERENCE TO RELATED APPLICATION

This U.S. nonprovisional application claims priority under 35 U.S.C § 119 to Korean Patent Application No. 10-2022-0056439, filed on May 9, 2022 in the Korean Intellectual Property Office, the disclosure of which is hereby incorporated by reference in its entirety.

TECHNICAL FIELD

The present disclosure relates to a display device and, more specifically, to a display device including a light receiving element.

DISCUSSION OF THE RELATED ART

Electronic products, such as smart phones, digital cameras, laptop computers, navigation systems, and smart televisions, include a display device for displaying an image. The display device includes a display panel for generating an image. The display device may also include an input apparatus such as an input sensing part, a camera, and various other sensors.

The input sensing part is disposed on the display panel and is configured to detect a user's touch. The camera captures and stores an external image. The sensors may include a fingerprint sensor, a proximity sensor, and an illumination sensor. The fingerprint sensor, among the sensors, detects a fingerprint provided on the display panel. The fingerprint sensor is generally fabricated as a separate module and is disposed within the display device.

SUMMARY

A display device includes a light emitting element; a pixel circuit disposed below the light emitting element and electrically connected to the light emitting element; a first light receiving element adjacent to the light emitting element; a sensing circuit disposed below the first light receiving element and electrically connected to the first light receiving element; a second light receiving element spaced apart from the first light receiving element and electrically connected to the sensing circuit, the second light receiving element being adjacent to the light emitting element; and a dummy circuit pattern disposed below the second light receiving element.

A display device includes a light emitting element; a pixel circuit disposed below the light emitting element and electrically connected to the light emitting element; a first light receiving element adjacent to the light emitting element; a sensing circuit disposed below the first light receiving element and electrically connected to the first light receiving element; a second light receiving element spaced apart from the first light receiving element and electrically connected to the sensing circuit, the second light receiving element being adjacent to the light emitting element; and a dummy circuit pattern disposed below the second light receiving element and not electrically connected to either the light emitting element, the first light receiving element, or the second light receiving element.

A display device includes a light emitting element disposed on a display area; a pixel circuit disposed below the light emitting element and electrically connected to the light emitting element; a first light receiving element disposed on the display area; a sensing circuit disposed below the first light receiving element and electrically connected to the first light receiving element; a second light receiving element that is spaced apart from the first light receiving element and electrically connected to the sensing circuit and is adjacent to a boundary between the display area and a non-displayer area proximate to the display area; and a dummy circuit pattern disposed below the second light receiving element. The dummy circuit pattern is symmetric with respect to the pixel circuit.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Figure 1:
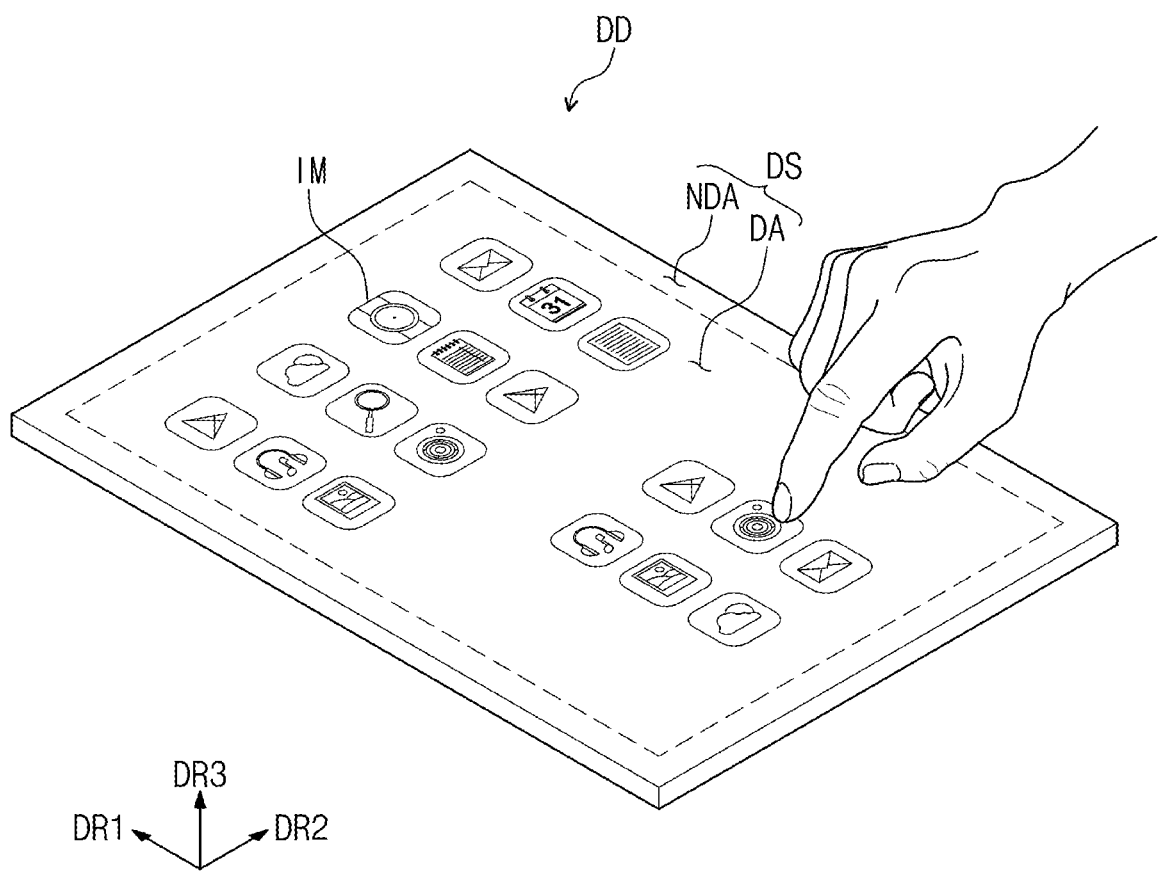
FIG. 1 is a perspective view showing a display device according to an embodiment of the present invention.

In this description, when a certain component (or region, layer, portion, etc.) is referred to as being "on", "connected to", or "coupled to" other component(s), the certain component may be directly disposed on, directly connected to, or directly coupled to the other component(s) or at least one intervening component may be present therebetween.

Like numerals may indicate like components throughout the specification and the drawings.

The term "and/or" includes one or more combinations defined by associated components.

It will be understood that, although the terms first, second, etc. may be used herein to describe various components, these components should not necessarily be limited by these terms. These terms are used to distinguish one component from another component. For example, a first component could be termed a second component, and vice versa without departing from the scope of the present inventive concepts. Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

The following will now describe some embodiments of the present invention in conjunction with the accompanying drawings.

FIG. 1 is a perspective view showing a display device according to an embodiment of the present invention.

Referring to FIG. 1, a display device DD, according to an embodiment of the present invention, may have a substantially rectangular shape having a pair of long sides that extend in a first direction DR1 and a pair of short sides that extend in a second direction DR2 intersecting the first direction DR1. The present invention, however, is not necessarily limited thereto, and the display device DD may have a circular shape, a polygonal shape, or any other suitable shape.

A third direction DR3 is defined hereinafter as a direction that substantially vertically intersects a plane defined by the first direction DR1 and the second direction DR2. In this description, the phrase "in a plan view" means that "when viewed in the third direction DR3."

The display device DD may have a top surface defined as a display surface DS, and the top surface may have a plane defined by the first direction DR1 and the second direction DR2. The display surface DS may provide users with images IM generated from the display device DD.

The display surface DS may include a display area DA and a non-display area NDA proximate to the display area DA. The display area DA may display an image, and the non-display area NDA may display no image. The non-display area NDA may at least partially surround the display area DA and may provide the display device DD with an edge that is printed with a certain color.

The display device DD may be used for large-sized display apparatuses such as televisions, monitors, or outdoor billboards. In addition, the display device DD may be used for small and medium-sized electronic products, such as personal computers, laptop computers, personal digital terminals, automotive navigation systems, game consoles, smart phones, tablet computers, or cameras. These products are presented by way of example and the display device DD may be used for any other electronic products without departing from the present inventive concept.

Figure 2:
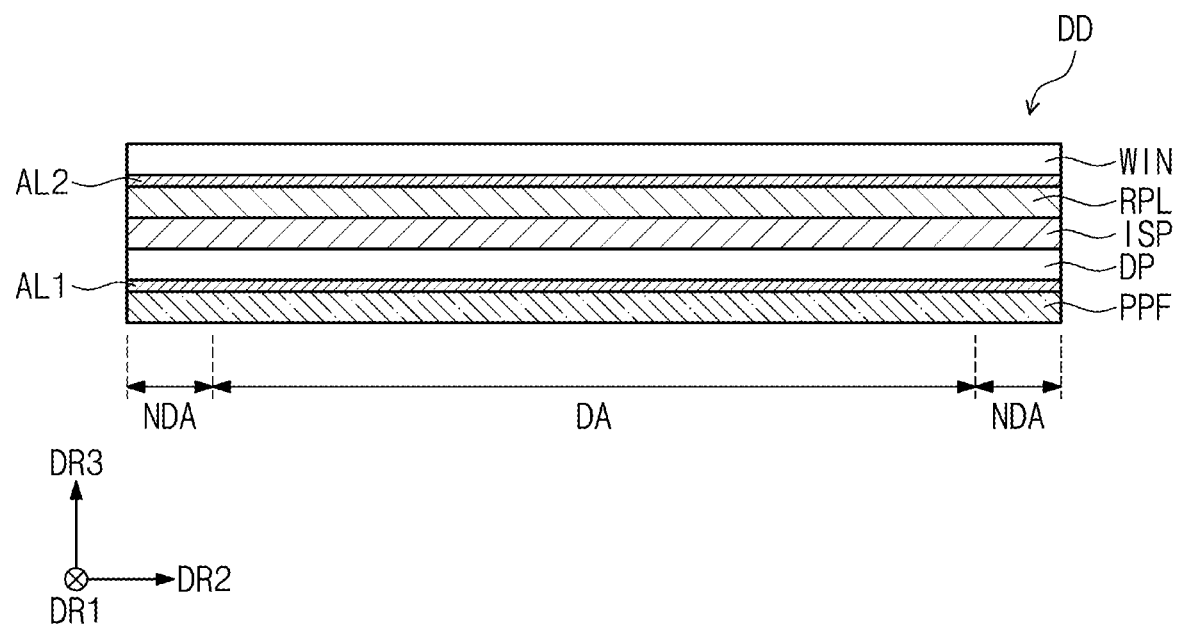
FIG. 2 is a cross-sectional view showing an example of the display device depicted in FIG. 1.

FIG. 2 is a cross-sectional view showing an example of the display device depicted in FIG. 1.

FIG. 2 shows, by way of example, a cross-section of the display device DD when viewed in the first direction DR1.

Referring to FIG. 2, the display device DD may include a display panel DP, an input sensing part ISP, an antireflection layer RPL, a window WIN, a panel protection film PPF, and first and second adhesion layers AL1 and AL2.

The display panel DP may be a flexible display panel. The display panel DP, according to an embodiment of the present invention, may be an emissive display panel, but the present invention is not necessarily particularly limited thereto. For example, the display panel DP may be an organic light emitting display panel or an inorganic light emitting display panel. An emission layer of the organic light emitting display panel may include an organic light emitting material. An emission layer of the inorganic light emitting display panel may include a quantum-dot or a quantum-rod. The following will describe an example in which an organic light emitting display panel is used as the display panel DP.

The input sensing part ISP may be disposed on the display panel DP. The input sensing part ISP may include a plurality of sensors that use a capacitance method to detect an external input. The input sensing part ISP may be directly manufactured on the display panel DP when the display device DD is fabricated. The present invention, however, is not necessarily limited thereto, and when the display panel DP is manufactured, the input sensing part ISP may be separately fabricated in the form of a panel and then attached to the display panel DP through an adhesion layer.

The antireflection layer RPL may be disposed on the input sensing part ISP. The antireflection layer RPL may be directly manufactured on the display panel DP when the display device DD is fabricated. The present invention, however, is not necessarily limited thereto, and when the display panel DP is manufactured, the antireflection layer RPL may be separately fabricated in the form of a panel and then attached to the input sensing part ISP through an adhesion layer The antireflection layer RPL may be defined as a film for preventing reflection of external light. The antireflection layer RPL may reduce a reflectance of external light that is incident toward the display panel DP from outside the display device DD. The antireflection layer RPL might not allow users to recognize the external light.

The window WIN may be disposed on the antireflection layer RPL. The window WIN may protect the display panel DP, the input sensing part ISP, and the antireflection layer RPL against external scratches and impact.

The panel protection film PPF may be disposed below the display panel DP. The panel protection film PPF may protect a lower portion of the display panel DP. The panel protection film PPF may include a flexible plastic material, such as polyethylene terephthalate (PET).

The first adhesion layer AL1 may be disposed between the display panel DP and the panel protection film PPF, and may bond the display panel DP and the panel protection film PPF to each other. The second adhesion layer AL2 may be disposed between the window WIN and the antireflection layer RPL, and may bond the window WIN and the antireflection layer RPL to each other.

Figure 3:
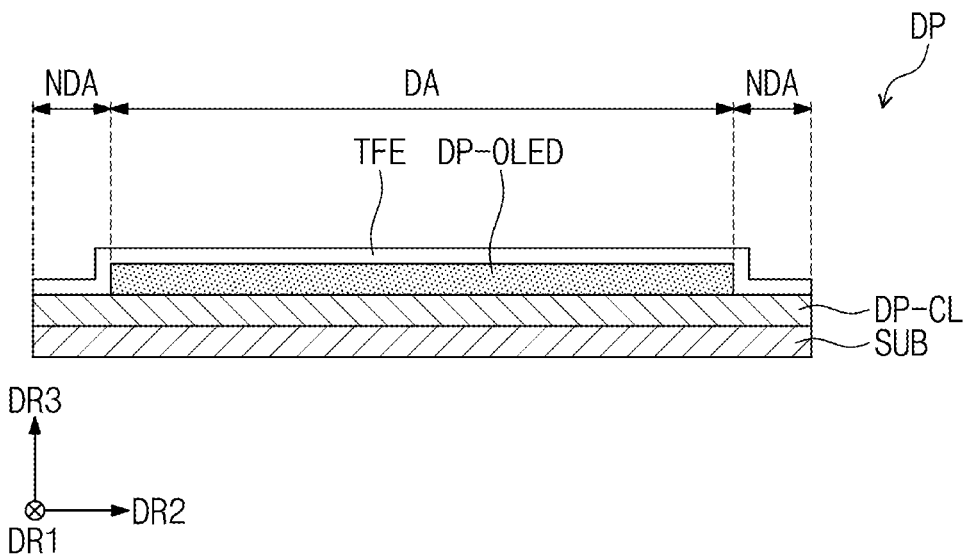
FIG. 3 is a cross-sectional view showing an example of the display panel depicted in FIG. 2.

FIG. 3 is a cross-sectional view showing an example of the display panel depicted in FIG. 2.

FIG. 3 shows, by way of example a cross-section of the display panel DP when viewed in the first direction DR1.

Referring to FIG. 3, the display panel DP may include a substrate SUB, a circuit element layer DP-CL disposed on the substrate SUB, a display element layer DP-OLED disposed on the circuit element layer DP-CL, and a thin-film encapsulation layer TFE disposed on the display element layer DP-OLED.

The substrate SUB may include a display area DA and a non-display area NDA proximate to the display area DA. The substrate SUB may include glass or a flexible plastic material such as polyimide (PI). The display element layer DP-OLED may be disposed on the display area DA.

A plurality of pixels may be disposed on the circuit element layer DP-CL and the display element layer DP-OLED. Each of the pixels may include a transistor disposed on the circuit element layer DP-CL, and may also include a light emitting element disposed on the display element layer DP-OLED and electrically connected to the transistor. A configuration of the pixel will be further discussed in detail below.

The thin-film encapsulation layer TFE may be disposed on the circuit element layer DP-CL and may cover the display element layer DP-OLED. The thin-film encapsulation layer TFE may protect the pixels against moisture, oxygen, and foreign substances.

Figure 4:
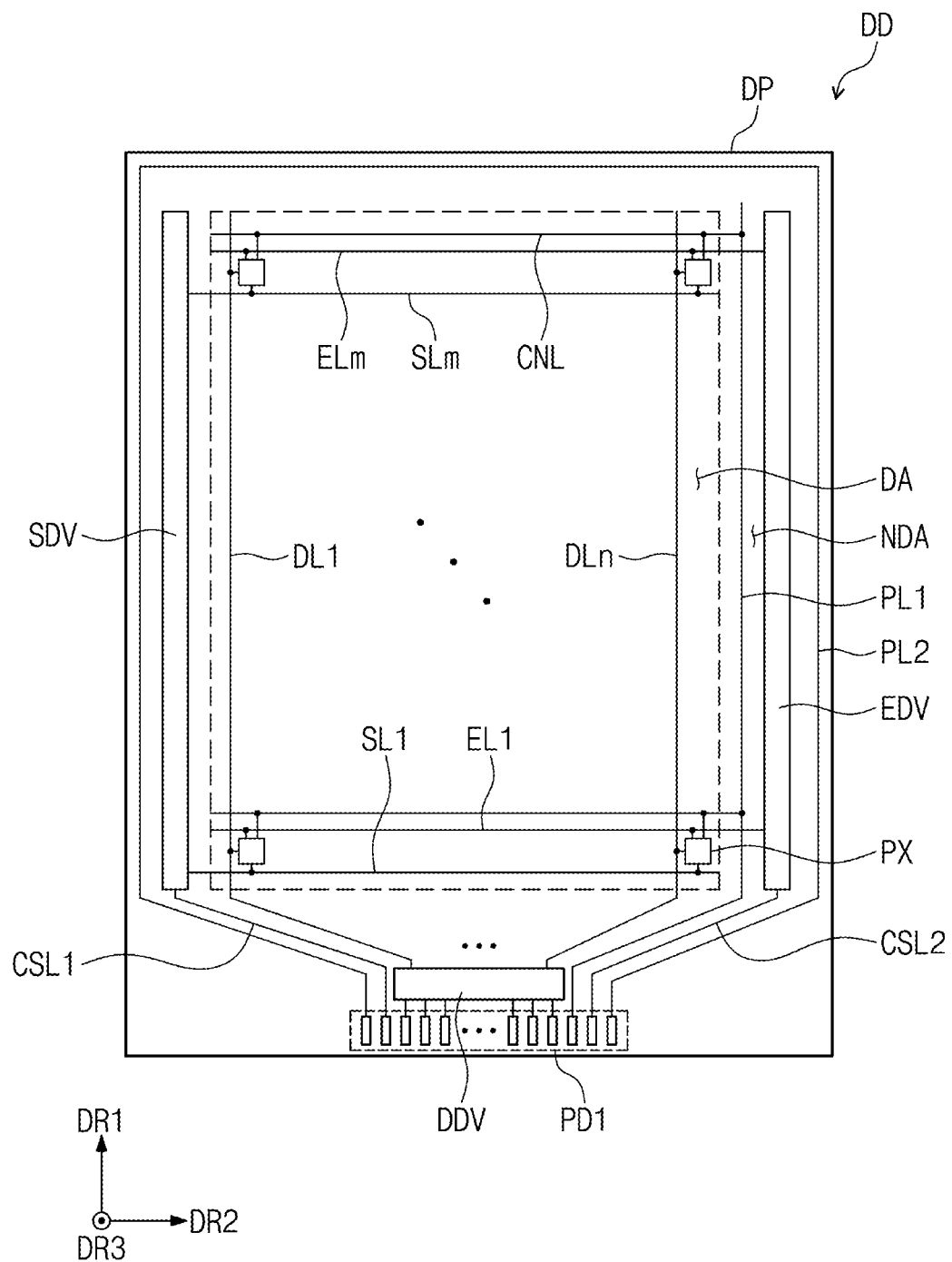
FIG. 4 is a plan view showing the display panel depicted in FIG. 2.

FIG. 4 is a plan view showing the display panel depicted in FIG. 2.

Referring to FIG. 4, the display device DD may include a display panel DP, a scan driver SDV, a data driver DDV, an emission driver EDV, and a plurality of pads PD.

The display panel DP may have a substantially rectangular shape having a pair of long sides that extend in the first direction DR1 and a pair of short sides that extend in the second direction DR2, but no limitation is imposed on the shape of the display panel DP. The display panel DP may include a display area DA and a non-display area NDA that surrounds the display area DA.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, first and second power lines PL1 and PL2, and connection lines CNL. The subscripts "m" and "n" are positive integers. The display panel DP may include a plurality of fingerprint sensors. The following will describe in detail a circuit configuration, a stack structure, and a planar arrangement of the fingerprint sensors.

The pixels PX may be disposed on the display area DA. The scan driver SDV and the emission driver EDV may be disposed on the non-display area NDA adjacent to the long sides of the display panel DP. The data driver DDV may be disposed on the non-display area NDA adjacent to one of the short sides of the display panel DP. In a plan view, the data driver DDV may be adjacent to a bottom end of the display panel DP.

The scan lines SL1 to SLm may extend in the second direction DR2 to come into connection with the pixels PX and the scan driver SDV. The data lines DL1 to DLn may extend in the first direction DR1 to come into connection with the pixels PX and the data driver DDV. The emission lines EL1 to ELm may extend in the second direction DR2 to come into connection with the pixels PX and the emission driver EDV.

The first power line PL1 may extend in the first direction DR1 to be disposed on the non-display area NDA. The first power line PL1 may be disposed between the display area DA and the emission driver EDV or between the display area DA and the scan driver SDV, but the present invention is not necessarily limited thereto.

The connection lines CNL may extend in the second direction DR2, and may be arranged in the first direction DR1 to come into connection with the first power line PL1 and the pixels PX. A first voltage may be applied to the pixels PX through the first power line PL1 and the connection lines CNL electrically connected to the first power line PL1.

The second power line PL2 may be disposed on the non-display area NDA, and may extend along the long sides of the display panel DP and along the short side around which the data driver DDV is not disposed. The second power line PL2 may be disposed more outwardly than the scan driver SDV and the emission driver EDV.

The second power line PL2 may extend toward the display area DA to come into connection with the pixels PX. The second power line PL2 may supply the pixels PX with a second voltage that is less than the first voltage.

The first control line CSL1 may be electrically connected to the scan driver SDV and may extend toward the bottom end of the display panel DP. The second control line CSL2 may be electrically connected to the emission driver EDV, and in a plan view, may extend toward the bottom end of the display panel DP. The data driver DDV may be disposed between the first control line CSL1 and the second control line CSL2.

The pads PD may be non-display area NDA adjacent to the bottom end of the display panel DP, and may be closer than the data driver DDV to the bottom end of the display panel DP. The data driver DDV, the first and second power lines PL1 and PL2, and the first and second control lines CSL1 and CSL2 may be electrically connected to the pads PD. The data lines DL1 to DLn may be electrically connected to the data driver DDV, and the data driver DDV may be electrically connected to the pads PD that correspond to the data lines DL1 to DLn.

The display device DD may further include a timing controller that controls operations of the scan driver SDV, the data driver DDV, and the emission driver EDV, and may further include a voltage generator that produces the first and second voltages. The timing controller and the voltage generator may be electrically connected through a printed circuit board to the pads PD.

The scan driver SDV may generate a plurality of scan signals, and the scan signals may be applied through the scan lines SL1 to SLm to the pixels PX. The data driver DDV may generate a plurality of data voltages, and the data voltages may be applied through the data lines DL1 to DLn to the pixels PX. The emission driver EDV may generate a plurality of light emission signals, and the light emission signals may be applied through the emission lines EL1 to ELn to the pixels PX.

In response to the scan signals, the data voltages may be provided to the pixels PX. In response to the emission signals, the pixels PX may emit light whose brightness corresponds to the data voltages, thereby displaying an image.

Figure 5:
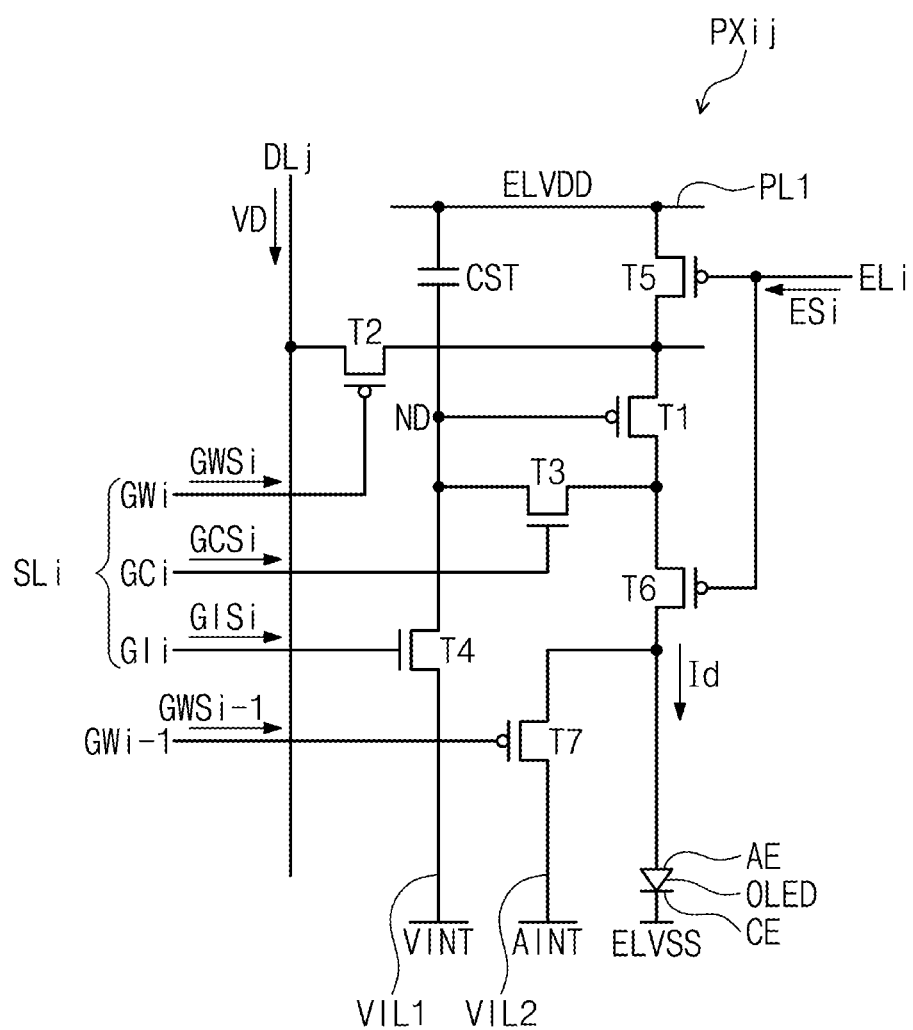
FIG. 5 is an equivalent circuit diagram showing one pixel depicted in FIG. 4.
Figure 6:
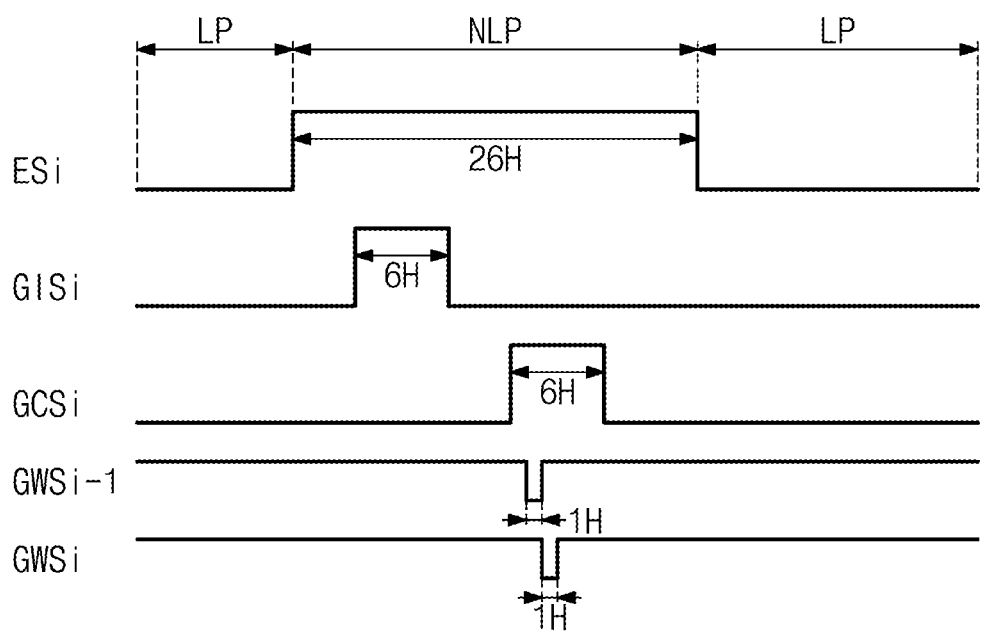
FIG. 6 is a timing diagram of signals for driving the pixel depicted in FIG. 5.

FIG. 5 is an equivalent circuit diagram showing one pixel depicted in FIG. 4. FIG. 6 is a timing diagram of signals for driving the pixel depicted in FIG. 5.

FIG. 5 depicts, by way of example, a pixel PXij electrically connected to an $i^{th}$ scan line SLi, an $i^{th}$ emission line Eli, and an $j^{th}$ data line DLj. The subscripts "i" and "j" are positive integers.

Referring to FIG. 5, the pixel PXij may include a light emitting element OLED, a plurality of transistors T1 to T7, and a capacitor CST. The transistors T1 to T7 and the capacitor CST may control an amount of current that flows through the light emitting element OLED. The light emitting element OLED may generate light having brightness based on the amount of current provided thereto.

The $i^{th}$ scan line SLi may include an $i^{th}$ write scan line GWi, an $i^{th}$ compensation scan line GCi, and an $i^{th}$ initialization scan line Gli. The $i^{th}$ write scan line GWi may receive an $i^{th}$ write scan signal GWSi, the $i^{th}$ compensation scan line GCi may receive an $i^{th}$ compensation scan signal GCSi, and the $i^{th}$ initialization scan line Gli may receive an $i^{th}$ initialization scan signal GISi.

The transistors T1 to T7 may each include a source electrode, a drain electrode, and a gate electrode. In FIG. 5, for brevity of description, one of the source electrode and the drain electrode is called a first electrode, and the other of the source electrode and the drain electrode is called a second electrode. In addition, the gate electrode is defined as a control electrode.

The transistors T1 to T7 may include first to seventh transistors T1 to T7. The first, second, fifth, sixth, and seventh transistors T1, T2, T5, T6, and T7 may include PMOS transistors. The third and fourth transistors T3 and T4 may include NMOS transistors.

The first transistor T1 may be defined as a driver transistor, and the second transistor T2 may be defined as a switching transistor. The third transistor T3 may be defined as a compensation transistor.

The fourth and seventh transistors T4 and T7 may each be defined as an initialization transistor. The fifth and sixth transistors T5 and T6 may each be defined as an emission control transistor.

The light emitting element OLED may be defined as an organic light emitting element. The light emitting element OLED may include an anode AE and a cathode CE. The anode AE may receive a first voltage ELVDD through the sixth, first, and fifth transistors T6, T1, and T5. The cathode CE may receive a second voltage ELVSS.

The first transistor T1 may be coupled between the fifth transistor T5 and the sixth transistor T6. The first transistor T1 may include a first electrode that receives the first voltage ELVDD through the fifth transistor T5, a second electrode that is coupled through the sixth transistor T6 to the anode AE, and a control electrode that is coupled to a node ND.

A first electrode of the first transistor T1 may be coupled to the fifth transistor T5, and a second electrode of the first transistor T1 may be coupled to the sixth transistor T6. In accordance with a voltage of the node ND applied to a control electrode of the first transistor T1, the first transistor T1 may control an amount of current that flows through the light emitting element OLED.

The second transistor T2 may be coupled between the $j^{th}$ data line DLj and the first electrode of the first transistor T1. The second transistor T2 may include a first electrode coupled to the $j^{th}$ data line Dlj, a second electrode coupled to the first electrode of the first transistor T1, and a control electrode coupled to the $i^{th}$ write scan line GWi.

When the $i^{th}$ write scan signal GWSi is applied to the second transistor T2 through the $i^{th}$ write scan line GWi, the second transistor T2 may be turned on to electrically couple the $j^{th}$ data line DLj to the first electrode of the first transistor T1. The second transistor T2 may perform a switching operation that provides the first electrode of the first transistor T1 with a data voltage VD supplied through the $j^{th}$ data line DLj.

The third transistor T3 may be coupled between the node ND and the second electrode of the first transistor T1. The third transistor T3 may include a first electrode coupled to the second electrode of the first transistor T1, a second electrode coupled to the node ND, and a control electrode coupled to the $i^{th}$ compensation scan line GCi.

When the $i^{th}$ compensation scan signal GCSi is applied to the third transistor T3 through the $i^{th}$ compensation scan line GCi, the third transistor T3 may be turned on to electrically couple the second electrode of the first transistor T1 to the control electrode of the first transistor T1. When the third transistor T3 is turned on, the first transistor T1 and the third transistor T3 may be coupled to act as a diode.

The fourth transistor T4 may be coupled to the node ND. The fourth transistor T4 may include a first electrode coupled to the node ND, a second electrode coupled to a first initialization line VIL1, and a control electrode coupled to the $i^{th}$ initialization scan line Gli. When the $i^{th}$ initialization scan signal GISi is applied to the fourth transistor T4 through the $i^{th}$ initialization scan line Gli, the fourth transistor T4 may be turned on to provide the node ND with a first initialization voltage VINT applied through the first initialization line VIL1.

The fifth transistor T5 may include a first electrode that receives the first voltage ELVDD, a second electrode coupled to the first electrode of the first transistor T1, and a control electrode coupled to the $i^{th}$ emission line ELi.

The sixth transistor T6 may include a first electrode coupled to the second electrode of the first transistor T1, a second electrode coupled to the anode AE, and a control electrode coupled to the $i^{th}$ emission line ELi.

The fifth and sixth transistors T5 and T6 may be turned on by an $i^{th}$ emission signal ESi applied through the $i^{th}$ emissions line ELi. The turned-on fifth and sixth transistors T5 and T6 may provide the light emitting element OLED with the first voltage ELVDD to allow a drive current to flow through the light emitting element OLED. Accordingly, the light emitting element OLED may emit light.

The seventh transistor T7 may include a first electrode coupled to the anode AE, a second electrode coupled to a second initialization line VIL2, and a control electrode coupled to an $(i-1)^{th}$ write scan line GWi-1. The $(i-1)^{th}$ write scan line GWi-1 may be defined to indicate a write scan line previous to the $i^{th}$ write scan line GWi.

When the $(i-1)^{th}$ write scan signal GWSi-1 is applied to the seventh transistor T7 through the $(i-1)^{th}$ write scan line GWi-1, the seventh transistor T7 may be turned on to provide the light emitting element OLED with a second initialization voltage AINT applied through the second initialization line VIL2.

In an embodiment of the present invention, the seventh transistor T7 may be omitted. In an embodiment of the present invention, the second initialization voltage AINT may have a voltage level that is different from, or alternatively the same as, that of the first initialization voltage VINT.

The capacitor CST may include a first electrode that receives the first voltage ELVDD and a second electrode that is coupled to the node ND. When the fifth and sixth transistors T5 and T6 are turned on, an amount of current flowing through the first transistor T1 may be determined in accordance with a voltage stored in the capacitor CST.

An operation of the pixel PXij will be discussed in detail below with reference to the timing diagram of FIG. 6.

Referring to FIGS. 5 and 6, the $i^{th}$ emission signal ESi may have a high level during a non-emission period NLP and a low level during an emission period LP.

An activation period of the $i^{th}$ write scan signal GWSi may be defined as a low level of the $i^{th}$ write scan signal GWSi. An activation period of each of the $i^{th}$ compensation scan signal GCSi and the $i^{th}$ initialization scan signal GISi may be defined as a high level of each of the $i^{th}$ compensation scan signal GCSi and the $i^{th}$ initialization scan signal GISi, respectively.

For example, the activation period 6H of the $i^{th}$ initialization scan signal GISi and the activation period 6H of the $i^{th}$ compensation scan signal GCSi may each be about 6 times the activation period 1H of the $i^{th}$ write scan signal GWSi.

After the $i^{th}$ initialization scan signal GISi is activated, the $i^{th}$ compensation scan signal GCSi and the $i^{th}$ write scan signal GWSi may be activated. During the emission period LP, the pixel PXij may be provided with the $i^{th}$ initialization scan signal GISi, the $i^{th}$ compensation scan signal GCSi, and the $i^{th}$ write scan signal GWSi, each of which signals GISi, GCSi, and GWSi is activated.

Hereinafter, an operation wherein each signal is applied to a transistor may indicate an operation where an activated signal is applied to a transistor.

The $i^{th}$ initialization scan signal GISi may be applied to and turn on the fourth transistor T4. The first initialization voltage VINT may be provided through the fourth transistor T4 to the node ND. Therefore, the first initialization voltage VINT may be applied to the control electrode of the first transistor T1, thereby initializing the first transistor T1.

The $(i-1)^{th}$ write scan signal GWSi-1 activated prior to the $i^{th}$ write scan signal GWSi may be applied to the control electrode of the seventh transistor T7, thereby turning on the seventh transistor T7. The second initialization voltage AINT may be provided through the seventh transistor T7 to the anode AE, and thus the anode AE may be initialized to the second initialization voltage AINT.

Afterwards, the $i^{th}$ write scan signal GWSi may be applied to and turn on the second transistor T2. In addition, the $i^{th}$ compensation scan signal GCSi may be applied to and turn on the third transistor T3.

Therefore, the first transistor T1 and the third transistor T3 may be coupled to each other to act as a diode. In this case, the control electrode of the first transistor T1 may be provided with a compensation voltage, Vd-Vth, obtained by subtracting a threshold voltage Vth of the first transistor T1 from the data voltage VD supplied through the $j^{th}$ data line DLj.

The first voltage ELVDD and the compensation voltage Vd-Vth may be respectively applied to the first electrode and the second electrode of the capacitor CST. The capacitor CST may store charges that correspond to a difference in voltage between the first electrode of the capacitor CST and the second electrode of the capacitor CST.

Thereafter, during the emission period LP, the $i^{th}$ emission signal ESi may be applied through the $i^{th}$ emission line ELi to the fifth transistor T5 and the sixth transistor T6, thereby turning on the fifth transistor T5 and the sixth transistor T6. In this case, there may occur a drive current Id that corresponds to a difference between the first voltage ELVDD and a voltage of the control electrode of the first transistor T1. The light emitting element OLED may be provided with the drive current Id through the sixth transistor T6, thereby emitting light.

During the emission period LP, due to the capacitor CST, a gate-source voltage Vgs of the first transistor T1 may be defined as a voltage difference between the first voltage ELVDD and the compensation voltage Vd-Vth, as expressed by the following Equation 1.

$$Vgs=ELVDD-(Vd-Vth)$$ [Equation 1]

A current-voltage relationship of the first transistor T1 is given by the following Equation 2. Equation 2 is a current-voltage relationship of a typical transistor.

$$Id=(1/2)\mu Cox(W/L)(Vgs-Vth)^2$$ [Equation 1]

When Equation 1 is inserted into Equation 2, the threshold voltage Vth is eliminated, and the drive current Id may be in proportion to $(ELVDD-Vd)^2$, or the square of a value derived by subtracting the data voltage VD from the first voltage ELVDD. Therefore, the drive current Id may be determined irrespective of the threshold voltage Vth of the first transistor T1. Such operation may be defined as a threshold voltage compensation operation.

Figure 7:
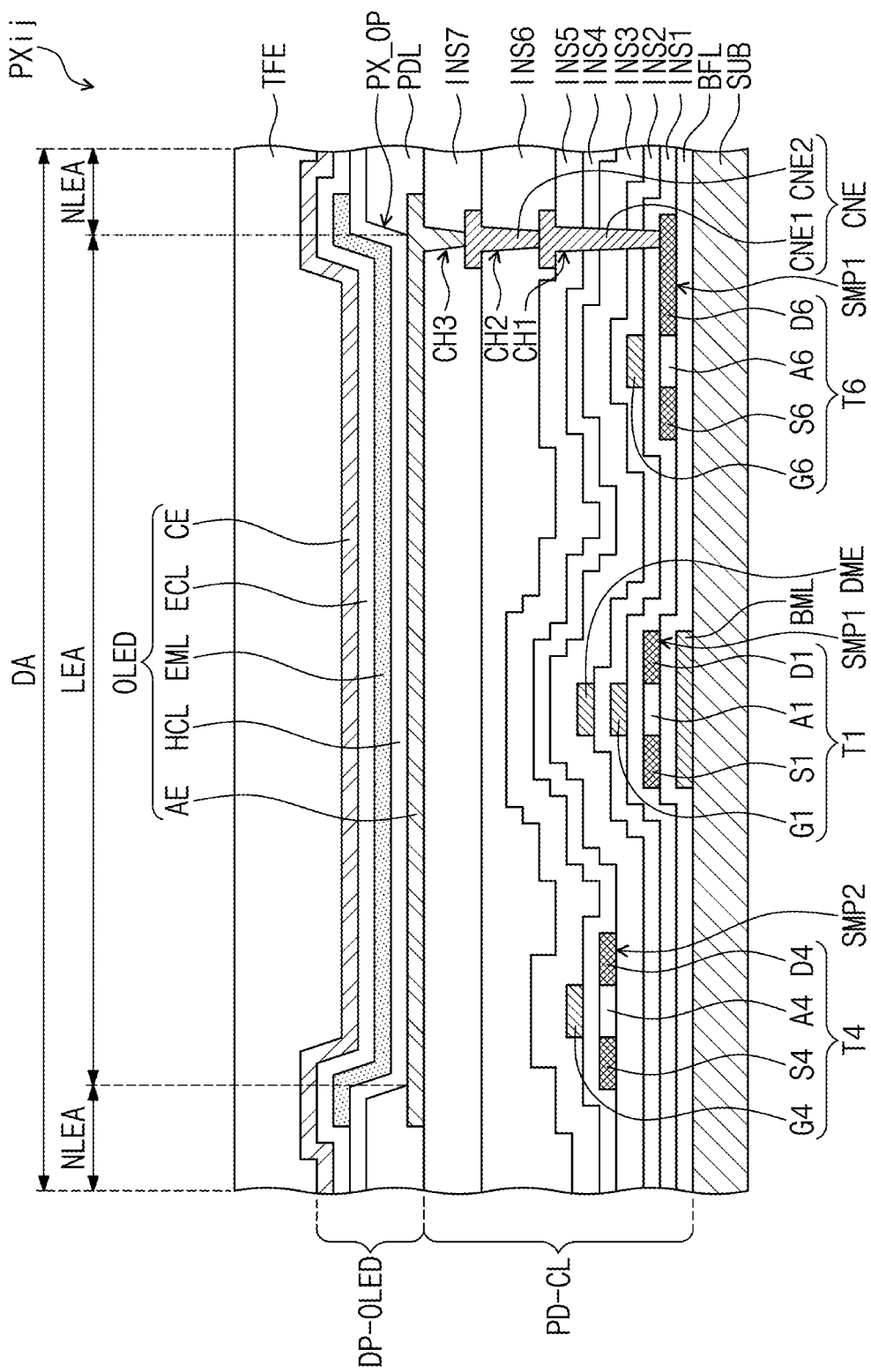
FIG. 7 is a cross-sectional view showing an example of a light emitting element, a first transistor, a fourth transistor, and a sixth transistor depicted in FIG. 5.

FIG. 7 is a cross-sectional view showing an example of the light emitting element, the first transistor, the fourth transistor, and the sixth transistor depicted in FIG. 5.

Referring to FIG. 7, the light emitting element OLED may include a first electrode AE, a second electrode CE, a hole control layer HCL, an electron control layer ECL, and an emission layer EML. The first electrodes AE may be the anode AE shown in FIG. 5, and the second electrode CE may be the cathode CE shown in FIG. 5.

The first, fourth, and sixth transistors T1, T4, and T6 and the light emitting element OLED may be disposed on the substrate SUB. The display area DA may include an emission area LEA that corresponds to the pixel PXij and a non-emission area NLEA proximate to the emission area LEA. The light emitting element OLED may be disposed on the emission area LEA.

A dummy pattern BML may be disposed on the substrate SUB. The dummy pattern BML may overlap the first transistor T1. The dummy pattern BML may be electrically connected to the first power line PL1 to receive the first voltage ELVDD. When a certain voltage is applied to the dummy pattern BML, the first transistor T1 disposed on the dummy pattern BML may have a threshold voltage Vth that is maintained without being changed. The dummy pattern BML may be omitted.

A buffer layer BFL may be disposed on the substrate SUB, and the buffer layer BFL may be an inorganic layer. The buffer layer BFL may cover the dummy pattern BML. The buffer layer BFL may be provided with a first semiconductor pattern SMP1 of each of the first and sixth transistors T1 and T6. The first semiconductor pattern SMP1 may include polysilicon. The present invention, however, is not necessarily limited thereto, and the first semiconductor pattern SMP1 may include amorphous silicon.

The first semiconductor pattern SMP1 may be doped with p-type or n-type impurities. The first semiconductor pattern SMP1 may include a heavily doped region and a lightly doped region. The heavily doped region may have a conductivity that is greater than that of the lightly doped region, and may serve as source and drain electrodes of a transistor. The lightly doped region may substantially correspond to an active region (or channel) of the transistor.

The first semiconductor pattern SMP1 may form a source electrode S1, an active region A1, and a drain electrode D1 of the first transistor T1, and a source electrode S6, an active region A6, and a drain electrode D6 of the sixth transistor T6. The active region A1 may be disposed between the source electrode S1 and the drain electrode D1. The active region A6 may be disposed between the source electrode S6 and the drain electrode D6.

A first dielectric layer INS1 may be disposed on the buffer layer BFL and may cover the first semiconductor pattern SMP1. The first dielectric layer INS1 may be provided thereon with gates electrodes (or control electrodes) G1 and G6 of the first and sixth transistors T1 and T6. The gate electrodes G1 and G6 may be defined as first gate patterns.

Structures of a source electrode, an active region, a drain electrode, and a gate electrode of each of the second, fifth, and seventh transistors T2, T5, and T7 may be substantially the same as those of the source electrodes S1 and S6, the active regions A1 and A6, the drain electrodes D1 and D6, and the gate electrodes G1 and G6 of the first and sixth transistors T1 and T6.

A second dielectric layer INS2 may be disposed on the first dielectric layer INS1 and may cover the gate electrodes G1 and G6. A dummy electrode DME may be disposed on the second dielectric layer INS2. The dummy electrode DME may be located at a level higher than that of the first and sixth transistors T1 and T6. The dummy electrode DME and the gate electrode G1 may constitute the capacitor CST discussed above. The dummy electrode DME may be defined as a second gate pattern. A third dielectric layer INS3 may be disposed on the second dielectric layer INS2 and may cover the dummy electrode DME.

A second semiconductor pattern SMP2 of the fourth transistor T4 may be disposed on the third dielectric layer INS3. The second semiconductor pattern SMP2 may include an oxide semiconductor formed of metal oxide. The oxide semiconductor may include a crystalline or amorphous oxide semiconductor.

The semiconductor pattern may include a plurality of regions that are distinguished based on whether metal oxide is reduced or not. A region (or reducing region) where metal oxide is reduced has conductivity greater than that of a region (or non-reducing region) where metal oxide is not reduced. The reduced region may substantially serve as a source electrode or a drain electrode of a transistor. The non-reducing region may substantially correspond to an active region (or channel) of the transistor.

The second semiconductor pattern SMP2 may form a source electrode S4, an active region A4, and a drain electrode D4 of the fourth transistor T4. The active region A4 may be disposed between the source electrode S4 and the drain electrode D4.

A fourth dielectric layer INS4 may be disposed on the third dielectric layer INS3 and may cover the second semiconductor pattern SMP2. The fourth dielectric layer INS4 may be provided thereon with a gate electrode G4 of the fourth transistor T4. The gate electrode G4 may be defined as a third gate pattern.

A fifth dielectric layer INS5 may be disposed on the fourth dielectric layer INS4 and may cover the gate electrode G4. Structures of a source electrode, an active region, a drain electrode, and a gate electrode of the third transistor T3 may be substantially the same as those of the source electrode S4, the active region A4, the drain electrode D4, and the gate electrode G4 of the fourth transistor T4.

The buffer layer BFL and the first to fifth dielectric layers INS1 to INS5 may include inorganic layers. For example, the buffer layer BFL, the first dielectric layer INS1, and the fourth dielectric layer INS4 may include a silicon oxide layer, and the second dielectric layer INS2 may include a silicon nitride layer.

The third and fifth dielectric layers INS3 and INS5 may include a plurality of stacked inorganic dielectric layers including different dielectric materials from each other. For example, the third dielectric layer INS3 may include a silicon nitride layer and a silicon oxide layer that are sequentially stacked, and the fifth dielectric layer INS5 may include a silicon oxide layer and a silicon nitride layer that are sequentially stacked. Each of the third and fifth dielectric layers INS3 and INS5 may have a thickness greater than that of each of the buffer layer BFL and the first, second, and fourth dielectric layers INS1, INS2, and INS4.

A connection electrode CNE may be disposed between the sixth transistor T6 and the light emitting element OLED. The connection electrode CNE may electrically connect the sixth transistor T6 and the light emitting element OLED to each other. The connection electrode CNE may include a first connection electrode CNE1 and a second connection electrode CNE2 disposed on the first connection electrode CNE1. The first connection electrode CNE1 may be defined as a first connection pattern, and the second connection electrode CNE2 may be defined as a second connection pattern.

The first connection electrode CNE1 may be disposed on the fifth dielectric layer INS5, and may be electrically connected to the drain electrode D6 through a first contact hole CH1 defined in the first to fifth dielectric layers INS1 to INS5. A sixth dielectric layer INS6 may be disposed on the fifth dielectric layer INS5 and may cover the first connection electrode CNE1.

The second connection electrode CNE2 may be disposed on the sixth dielectric layer INS6. The second connection electrode CNE2 may be electrically connected to the first connection electrode CNE1 through a second contact hole CH2 defined in the sixth dielectric layer INS6.

A seventh dielectric layer INS7 may be disposed on the sixth dielectric layer INS6 and may cover the second connection electrode CNE2. The sixth and seventh dielectric layers INS6 and INS7 may include an inorganic layer or an organic layer.

The first electrode AE may be disposed on the seventh dielectric layer INS7. The first electrode AE may be electrically connected to the second connection electrode CNE2 through a third contact hole CH3 defined in the seventh dielectric layer INS7. A pixel definition layer PDL may be disposed on the first electrode AE and the seventh dielectric layer INS7, and the pixel definition layer PDL may expose a portion of the first electrode AE. The pixel definition layer PDL may have an opening PX_OP that exposes the portion of the first electrode AE.

The hole control layer HCL may be disposed on the first electrode AE and the pixel definition layer PDL. The hole control layer HCL may be disposed in common on the emission area LEA and the non-emission area NLEA. The hole control layer HCL may include a hole transport layer and a hole injection layer.

The emission layer EML may be disposed on the hole control layer HCL. The emission layer EML may be disposed on a location that corresponds to the opening PX_OP. The emission layer EML may include one or more of an organic material and an inorganic material. The emission layer EML may generate one of red light, green light, and blue light.

The electron control layer ECL may be disposed on the emission layer EML and the hole control layer HCL. The electron control layer ECL may be disposed in common on the emission area LEA and the non-emission area NLEA. The electron control layer ECL may include an electron transport layer and an electron injection layer. The second electrode CE may be disposed on the electron control layer ECL. The second electrode CE may be disposed in common on the pixels PX.

The circuit element layer DP-CL may be defined by layers from the buffer layer BFL to the seventh dielectric layer INS7. A layer where the light emitting element OLED is disposed may be defined as the display element layer DP-OLED.

The thin-film encapsulation layer TFE may be disposed on the light emitting element OLED. The thin-film encapsulation layer TFE may include an inorganic layer, an organic layer, and an inorganic layer that are sequentially stacked. The inorganic layers may include an inorganic material, and may protect pixels against moisture and/or oxygen. The organic layer may include an organic material, and may protect pixels against foreign substances such as dust particles.

The first voltage ELVDD may be applied to the first electrode AE, and the second voltage ELVSS may be applied to the second electrode CE. Holes and electrons injected into the emission layer EML may combine with each other to produce excitons, and the light emitting element OLED may emit light as the excitons return to ground state. The light emitting element OLED may emit light to display an image.

Figure 8:
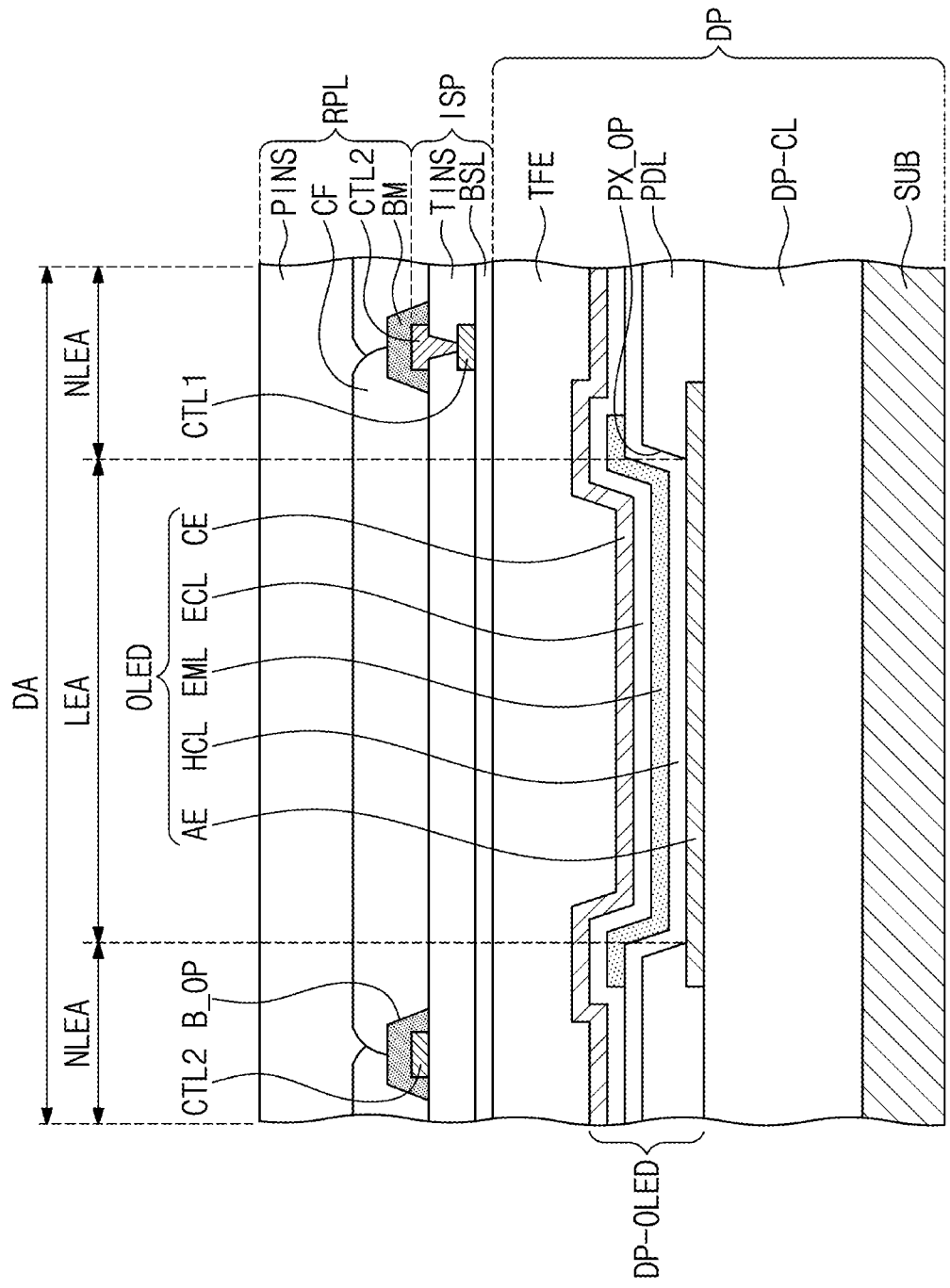
FIG. 8 is a cross-sectional view showing an example of a display panel, an input sensing part, and an antireflection layer that correspond to one pixel in FIG. 2.

FIG. 8 is a cross-sectional view showing an example of a display panel, an input sensing part, and an antireflection layer that correspond to one pixel in FIG. 2.

FIG. 8 exemplarily depicts the circuit element layer DP-CL as a single layer.

Referring to FIG. 8, the input sensing part ISP may be disposed on the thin-film encapsulation layer TFE. The input sensing part ISP may be manufactured directly on a top surface of the thin-film encapsulation layer TFE.

A base layer BSL may be disposed on the thin-film encapsulation layer TFE. The base layer BSL may include an inorganic dielectric material. At least one inorganic dielectric layer, as the base layer BSL, may be provided on the thin-film encapsulation layer TFE.

The input sensing part ISP may include a first conductive pattern CTL1 and a second conductive pattern CTL2 disposed on the first conductive pattern CTL1. The first conductive pattern CTL1 may be disposed on the base layer BSL. A dielectric layer TINS may be disposed on the base layer BSL and may cover the first conductive pattern CTL1. The dielectric layer TINS may include an inorganic dielectric layer or an organic dielectric layer. The second conductive pattern CTL2 may be disposed on the dielectric layer TINS.

The first and second conductive patterns CTL1 and CTL2 may overlap the non-emission area NLEA. The first and second conductive patterns CTL1 and CTL2 may be disposed on the non-emission area NLEA between the emission areas LEA, and may have a mesh shape.

The first and second conductive patterns CTL1 and CTL2 may form sensors of the input sensing part ISP discussed above. For example, the mesh-shape first and second conductive patterns CTL1 and CTL2 may be separated from each other on a certain region, thereby forming sensors. A portion of the second conductive pattern CTL2 may be electrically connected to the first conductive pattern CTL1.

The antireflection layer RPL may be disposed on the second conductive pattern CTL2. The antireflection layer RPL may include a black matrix BM and a plurality of color filters CF. The black matrix BM may overlap the non-emission area NLEA, and the color filters CF may overlap corresponding emission areas LEA.

The black matrix BM may be disposed on the dielectric layer TINS and may cover the second conductive pattern CTL2. The black matrix BM may have an opening B_OP that overlaps the emission area LEA and the opening PX_OP. The black matrix BM may absorb and shield light. The opening B_OP may have a width that is greater than that of the opening PX_OP.

The color filters CF may be disposed on the dielectric layer TINS and the black matrix BM. The color filters CF may be disposed on corresponding openings B_OP. A planarization dielectric layer PINS may be disposed on the color filters CF. The planarization dielectric layer PINS may provide a flat top surface.

When a user is provided again with external light that travels toward and is reflected from the display panel DP, like a mirror effect, the external light may be visible to the user. To prevent effects of the phenomenon described above, the antireflection layer RPL may include a plurality of color filters CF that display the same colors as those generated from the pixels PX of the display panel DP.

The color filters CF may filter external light to produce the same colors of the pixels PX. In this case, the external light might not be visible to users. The present invention, however, is not necessarily limited thereto, and the antireflection layer RPL may include a polarization film for reducing a reflectance of external light. The polarization film may include one or more of a retarder and a polarizer.

Figure 9:
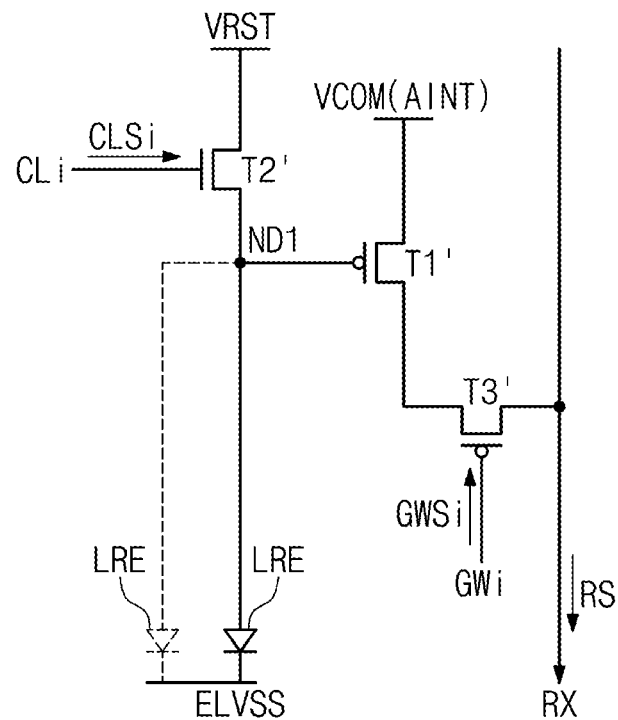
FIG. 9 is an equivalent circuit diagram showing a fingerprint sensor embedded in the display panel depicted in FIG. 2.
Figure 10:
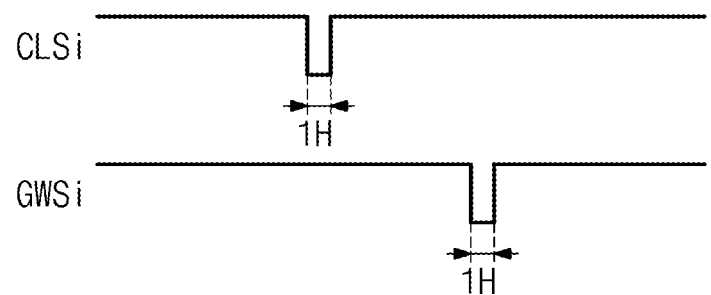
FIG. 10 is a timing diagram of signals for driving the fingerprint sensor depicted in FIG. 9.

FIG. 9 is an equivalent circuit diagram showing a fingerprint sensor embedded in the display panel depicted in FIG. 2. FIG. 10 is a timing diagram of signals for driving the fingerprint sensor depicted in FIG. 9.

Referring to FIG. 9, the display panel DP may include not only the pixels PX, but also a fingerprint sensor FSN. The fingerprint sensor FSN depicted in FIG. 9 may be provided in plural, and the plurality of fingerprint sensors FSN may be provided on the display panel.

The fingerprint sensor FSN may include a first transistor T1', a second transistor T2', a third transistor T3', and a light receiving element LRE. The first and third transistors T1' and T3' may include PMOS transistors, and the second transistor T2' may include an NMOS transistor.

In FIG. 9, one of source and drain electrodes of each of the first, second, and third transistors T1', T2', and T3' is called a first electrode, the other of source and drain electrodes of each of the first, second, and third transistors T1', T2', and T3' is called a second electrode, and a gate electrode of each of the first, second, and third transistors T1', T2', and T3' is called a control electrode.

The first transistor T1' may include a first electrode that receives a voltage VCOM having a certain voltage level, a control electrode coupled to a node ND1, and a second electrode coupled to the third transistor T3'. For example, the voltage VCOM may be set as a second initialization voltage AINT, or alternatively as a different voltage level.

The second transistor T2' may include a first electrode coupled to the node ND1, a control electrode coupled to an $i^{th}$ control line CLi, and a second electrode that receives a reset voltage VRST. The second transistor T2' may be turned on by an $i^{th}$ control signal CLSi received through the $i^{th}$ control line CLi.

The third transistor T3' may include a first electrode coupled to the second electrode of the first transistor T1', a control electrode coupled to the $i^{th}$ write scan line GWi, and a second electrode coupled to a receiving line RX. The third transistor T3' may be turned on by the $i^{th}$ write scan signal GWSi received through the $i^{th}$ write scan line GWi.

The light receiving element LRE may include a photodiode. An anode of the light receiving element LRE may be coupled to the node ND1, and a cathode of the light receiving element LRE may receive the second voltage ELVSS. The light receiving element LRE may convert an externally incident light energy into an electrical energy.

The fingerprint sensor FSN may include at least one light receiving element LRE. For example, a light receiving element LRE depicted by a dotted line in FIG. 9 may be additionally coupled to the node ND1. As shown in FIG. 9, the fingerprint sensor FSN may include two light receiving elements LRE, but no limitation is imposed on the number of the light receiving elements LRE included in the fingerprint sensor FSN.

Referring to FIGS. 9 and 10, after the $i^{th}$ control signal CLSi is activated, the $i^{th}$ write scan single GWSi may be activated. An activation period 1H of the $i^{th}$ control signal CLSi may be the same as the activation period 1H of the $i^{th}$ write scan signal GWSi.

The $i^{th}$ write scan signal GWSi may be applied to the control electrode of the second transistor T2', thereby turning on the second transistor T2'. The turned-on second transistor T2' may receive the reset voltage VRST to provide the node ND1 with the reset voltage VRST. The reset voltage VRST may reset the node ND1. A voltage of the node ND1 may be a voltage of the gate electrode of the first transistor T1'. Therefore, the reset voltage VRST may be applied to the control electrode of the first transistor T1', and thus the first transistor T1' may be reset.

The $i^{th}$ write scan signal GWSi may be applied to the control electrode of the third transistor T3', thereby turning on the third transistor T3'. The first transistor T1' may be coupled through the turned-on third transistor T3' to the receiving line RX.

The light receiving element LRE may receive light and covert the received light into an electrical signal, and in this case, the voltage of the node ND1 may be changed. When the first transistor T1' is turned on, the voltage VCOM provided to the first transistor T1' may be controlled based on a difference in voltage of the node ND1, and thus may be provided through the third transistor T3' to the receiving line RX. A sensing signal RS, or a signal sensed in the light receiving element LRE, may thus be output through the receiving line RX.

Figure 11:
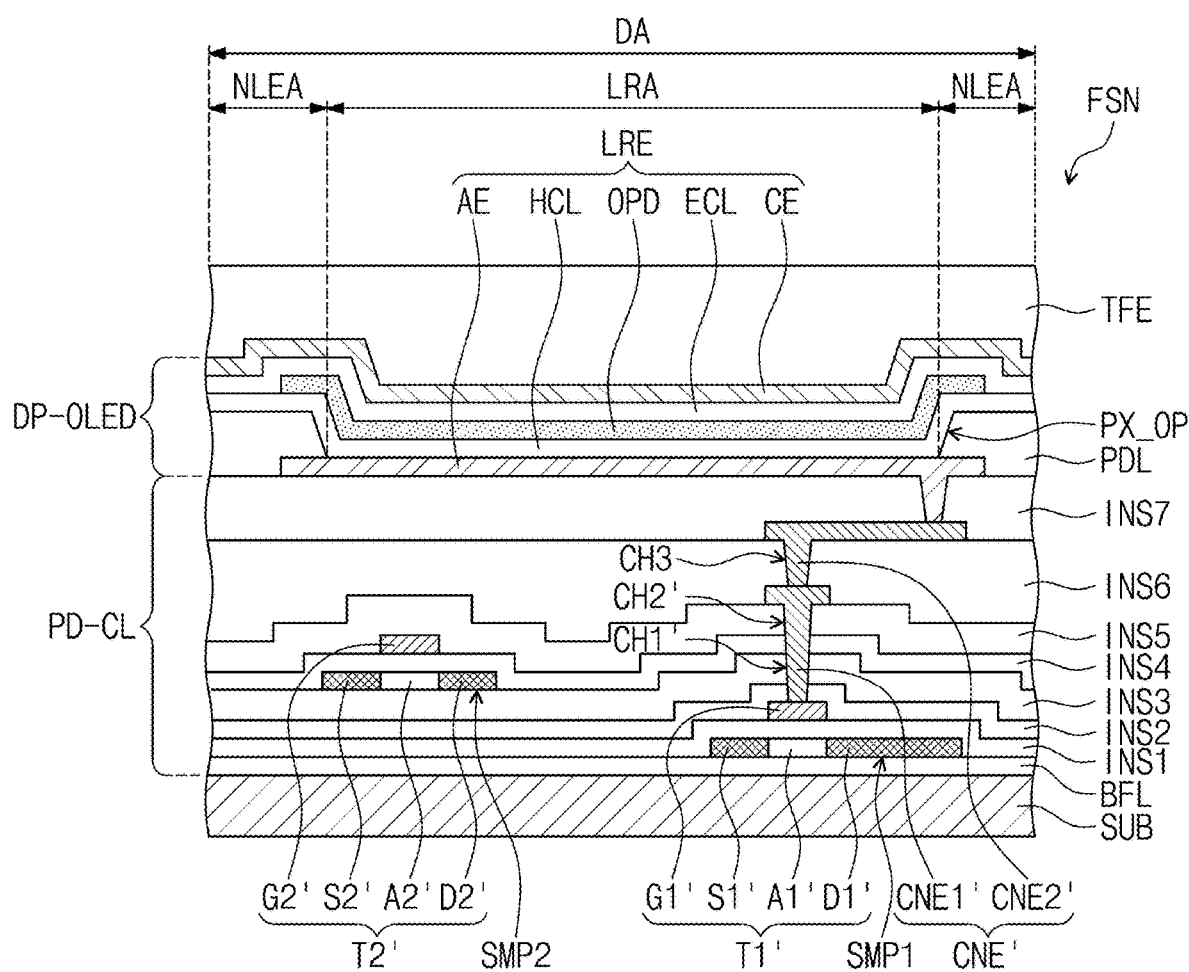
FIG. 11 is a cross-sectional view showing an example of a first transistor and a second transistor depicted in FIG. 9.

FIG. 11 is a cross-sectional view showing an example of the first transistor and the second transistor depicted in FIG. 9.

The following configuration depicted in FIG. 11 will focus on differences from the stack structure shown in FIG. 7.

Referring to FIG. 11, the display area DA may include a light receiving area LRA that corresponds to the fingerprint sensor FSN and a non-emission area NLEA adjacent to light receiving area LRA. The non-emission area NLEA may be the non-emission area NLEA illustrated in FIG. 7.

The light receiving element LRE may include a first electrode AE, a second electrode CE, a hole control layer HCL, an electron control layer ECL, and a light receiving layer OPD. The light receiving layer OPD may be defined as an organic photodiode. The first electrode AE, the second electrode CE, the hole control layer HCL, and the electron control layer ECL may be substantially the same as the first electrode AE, the second electrode CE, the hole control layer HCL, and the electron control layer ECL that are shown in FIG. 7, The light receiving layer OPD may be disposed on a position where the emission layer EML of FIG. 7 is disposed.

The first transistor T1' may include a source electrode S1', a drain electrode D1', an active region A1', and a gate electrode G1'. The first transistor T1' may include a source electrode S2', a drain electrode D2', an active region A2', and a gate electrode G2'.

A stack structure of the first transistor T1' may be substantially the same as that of the first transistor T1 depicted in FIG. 7. A stack structure of the second transistor T2' may be substantially the same as that of the fourth transistor T4 depicted in FIG. 7. A stack structure of the third transistor T3' may be substantially the same as that of the first transistor T1'.

A connection electrode CNE' may include a first connection electrode CNE1' and a second connection electrode CNE2'. The first connection electrode CNE1' may be disposed on the same level as that of the first connection layer CNE1 depicted in FIG. 7, and the second connection electrode CNE2' may be disposed on the same level as that of the second connection electrode CNE2 depicted in FIG. 7. Therefore, the first connection electrode CNE1' may be disposed on the fifth dielectric layer INS5, and the second connection electrode CNE2' may be disposed on the sixth dielectric layer INS6.

The first connection electrode CNE1' may be electrically connected through a first contact hole CH1' defined in the second to fifth dielectric layers INS2 to INS5 to the gate electrode G1' of the first transistor T1'. The second connection electrode CNE2' may be electrically connected to the first connection electrode CNE1' through a second contact hole CH2' defined in the sixth dielectric layer INS6. The first electrode AE of the light receiving element LRE may be electrically connected to the second connection electrode CNE2' through the third contact hole CH3 defined in the seventh dielectric layer INS7.

Figure 12:
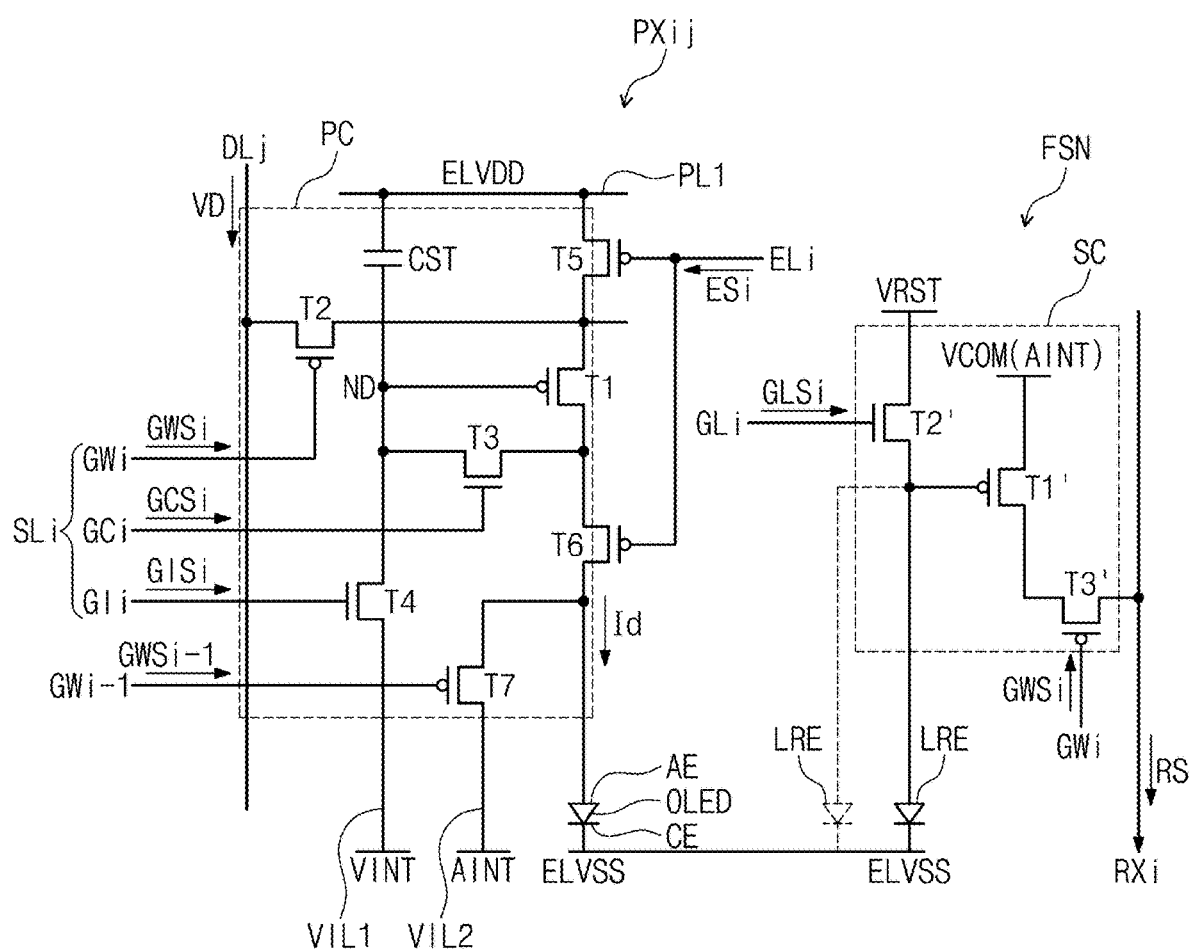
FIG. 12 is a circuit diagram showing an arrangement between the pixel and the fingerprint sensor depicted in FIGS. 7 and 9.

FIG. 12 is a circuit diagram showing an arrangement between the pixel and the fingerprint sensor depicted in FIGS. 7 and 9.

Referring to FIG. 12, the fingerprint sensor FSN may be adjacent to the pixel PXij. The pixel PXij may include a pixel circuit PC and light emitting element OLED electrically connected to the pixel circuit PC. The pixel circuit PC may include first to seventh transistors T1 to T7 and a capacitor CST.

The fingerprint sensor FSN may include a sensing circuit SC and a plurality of light receiving elements LRE electrically connected to the sensing circuit SC. The sensing circuit SC may include first, second, and third transistors T1', T2', and T3'.

Figure 13:
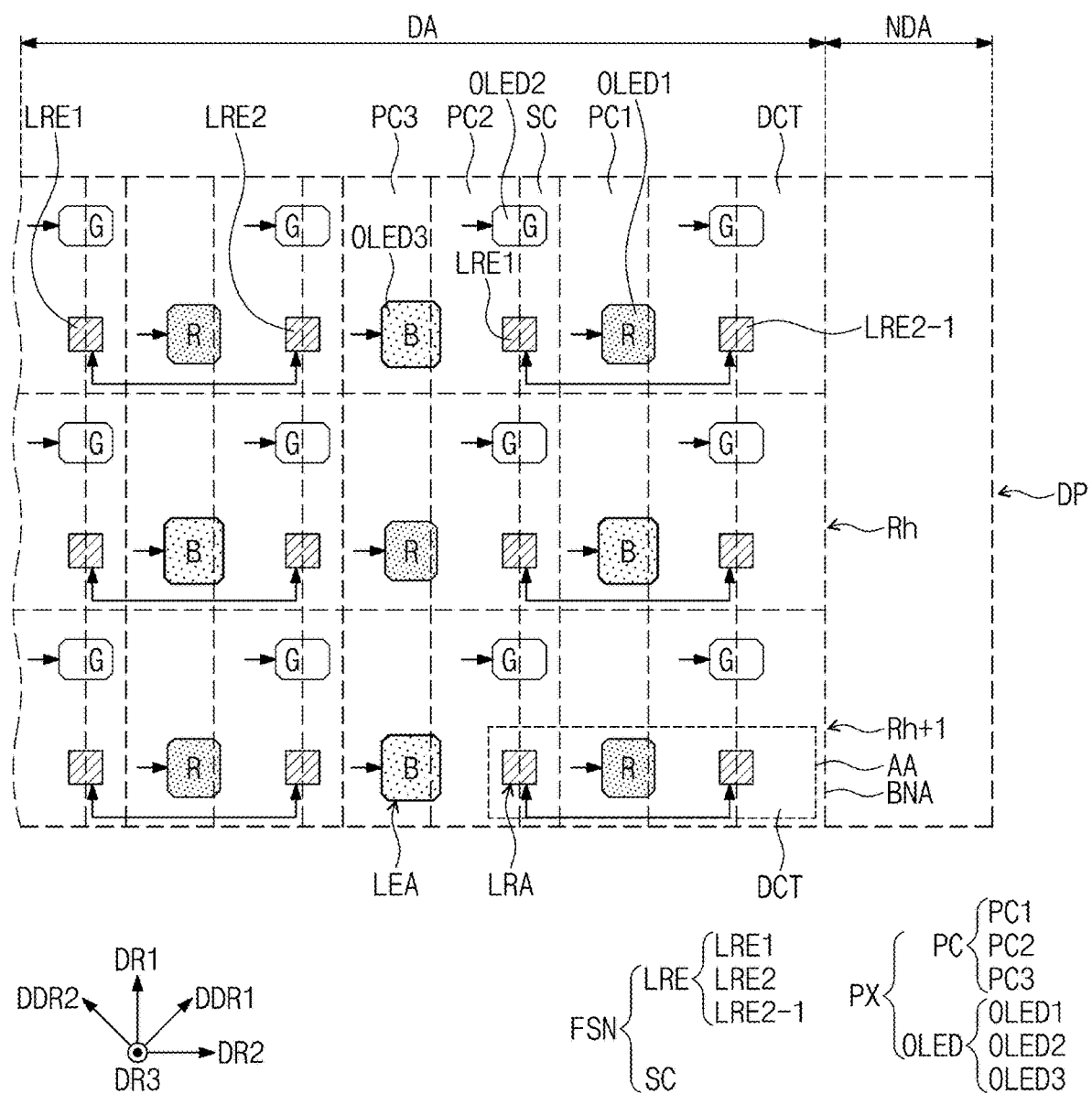
FIG. 13 is a schematic diagram showing a planar configuration of a display panel provided with a plurality of pixels and fingerprint sensors depicted in FIG. 12.

FIG. 13 is a schematic diagram showing a planar configuration of a display panel provided with a plurality of pixels and fingerprint sensors depicted in FIG. 12.

FIG. 13 depicts by way of example a planar view partially showing a right section of the display panel DP. In addition, dotted lines are shown to indicate regions where are disposed the pixel circuits PC and the sensing circuits SC, and solid lines are used to illustrate the light emitting elements OLED and the light receiving elements LRE.

Referring to FIG. 13, the display panel DP may include a plurality of pixels PX, a plurality of fingerprint sensors FSN, and a plurality of dummy circuit patterns DCT, all of which components are disposed on the display area DA.

The pixels PX may include a plurality of light emitting elements OLED and a plurality of pixel circuits PC disposed on the display area DA. Each of the pixel circuits PC may have a configuration of the pixel circuit PC depicted in FIG. 12. Each of the light emitting elements OLED may be electrically connected to a corresponding one of the pixel circuits PC. Arrows are exemplarily shown to denote states where the pixel circuits PC are electrically connected to the light emitting elements OLED.

The fingerprint sensors FSN may include a plurality of light receiving elements LRE and a plurality of sensing circuits SC disposed on the display area DA. Each of the sensing circuits SC may have a configuration of the sensing circuit SC depicted in FIG. 12. The light receiving elements LRE may be electrically connected to the sensing circuits SC. Arrows are exemplarily shown to denote states where the sensing circuits SC are electrically connected to the light receiving elements LRE. Each of the light receiving elements LRE may be disposed on the light receiving area LRA.

The light emitting elements OLED may include a plurality of first light emitting elements OLED1, a plurality of second light emitting elements OLED2, and a plurality of third light emitting elements OLED3. Each of the first, second, and third light emitting elements OLED1, OLED2, and OLED3 may be disposed on the emission area LEA. For example, the first light emitting elements OLED1 may represent red color R, the second light emitting elements OLED2 may represent green color G, and the third light emitting elements OLED3 may represent blue color B.

In this description below, a first diagonal direction DDR1 may be defined to indicate a direction that intersects the first and second directions DR1 and DR2 on a plane defined by the first and second directions DR1 and DR2. A second diagonal direction DDR2 may be defined to indicate a direction that intersects the first diagonal direction DDR1 on a plane defined by the first and second directions DR1 and DR2. For example, the first direction DR1 and the second direction DR2 may orthogonally intersect each other, and the first diagonal direction DDR1 and the second diagonal direction DDR2 may orthogonally intersect each other.

The first, second, and third light emitting elements OLED1, OLED2, and OLED3 may be arranged in the first diagonal direction DDR1 and the second diagonal direction DDR2. The first direction DR1 may correspond to a column, and the second direction DR2 may correspond to a row. The first and third light emitting elements OLED1 and OLED3 may be repeatedly arranged in an $h^{th}$ row Rh. The third and first light emitting elements OLED3 and OLED1 may be repeatedly arranged in an $(h+1)^{th}$ row Rh+1.

The third light emitting elements OLED3 in the $(h+1)^{th}$ row Rh+1 may be adjacent in the first direction DR1 to the first light emitting elements OLED1 in the $h^{th}$ row Rh. The first light emitting elements OLED1 in the $(h+1)^{th}$ row Rh+1 may be adjacent in the first direction DR1 to the third light emitting elements OLED3 in the $h^{th}$ row Rh. Each of the second light emitting elements OLED2 may be disposed between two first light emitting elements OLED1 arranged in the first and second diagonal directions DDR1 and DDR2 and between two third light emitting elements OLED3 arranged in the first and second diagonal directions DDR1 and DDR2.

As indicated by the dotted lines, the pixel circuits PC may be correspondingly disposed on divided rectangular regions. Each of the pixel circuits PC may have a configuration substantially the same as that of the pixel circuit PC depicted in FIG. 12.

The pixel circuits PC may be arranged in the first direction DR1 and the second direction DR2. The light emitting elements OLED might not entirely overlap corresponding pixel circuits PC. The light emitting elements OLED may partially overlap corresponding pixel circuits PC. As the light emitting elements OLED are disposed more to the right side than corresponding pixel circuits PC, left sections of the light emitting elements OLED may overlap the corresponding pixel circuits PC.

The pixel circuits PC may include a plurality of first pixel circuits PC1, a plurality of second pixel circuits PC2, and a plurality of third pixel circuits PC3. The first pixel circuits PC1 may be disposed below and electrically connected to the first light emitting elements OLED1. The second pixel circuits PC2 may be disposed below and electrically connected to the second light emitting elements OLED2. The third pixel circuits PC3 may be disposed below and electrically connected to the third light emitting elements OLED3.

The first and second pixel circuits PC1 and PC2 may be defined as RG pixel circuits, and the third and second pixel circuits PC3 and PC2 may be defined as BG pixel circuits. The sensing circuits SC may be disposed between the RG pixel circuits and the BG pixel circuits.

The following will exemplarily discuss an arrangement between a single first pixel circuit PC1, a single second pixel circuit PC2, a single third pixel circuit PC3, a single first light emitting element OLED1, a single second light emitting element OLED2, and a single third light emitting element OLED3.

The first light emitting element OLED1 may be disposed on the first pixel circuit PC1. In a plan view, the first light emitting element OLED1 might not entirely overlap the first pixel circuit PC1. In a plan view, the first light emitting element OLED1 may be disposed more to the right side than the first pixel circuit PC1.

The first light emitting element OLED1 may overlap a boundary between the first pixel circuit PC1 and the second pixel circuit PC2 that are adjacent to each other. Therefore, a left section of the first light emitting element OLED1 may overlap the first pixel circuit PC1, and a right section of the first light emitting element OLED1 may overlap the second pixel circuit PC2 adjacent to the first pixel circuit PC1. In a plan view, the first light emitting element OLED1 may be adjacent to a lower side of the first pixel circuit PC1.

The second light emitting element OLED2 may be disposed on the second pixel circuit PC2. In a plan view, the second light emitting element OLED2 might not entirely overlap the second pixel circuit PC2. The second light emitting element OLED2 may be disposed more to the right side than the second pixel circuit PC2.

The second light emitting element OLED2 may overlap a boundary between the second pixel circuit PC2 and the sensing circuit SC that are adjacent to each other. Therefore, a left section of the second light emitting element OLED2 may overlap the second pixel circuit PC2, and a right section of the second light emitting element OLED2 may overlap the sensing circuit SC. The second light emitting element OLED2 may be disposed adjacent to an upper side of the second pixel circuit PC2.

The third light emitting element OLED3 may be disposed on the third pixel circuit PC3. In a plan view, the third light emitting element OLED3 might not entirely overlap the third pixel circuit PC3. In a plan view, the third light emitting element OLED3 may be disposed more to the right side than the third pixel circuit PC3.

The third light emitting element OLED3 may overlap a boundary between the third pixel circuit PC3 and the second pixel circuit PC2 that are adjacent to each other. Therefore, a left section of the third light emitting element OLED3 may overlap the third pixel circuit PC3, and a right section of the third light emitting element OLED3 may overlap the second pixel circuit PC2 adjacent to the third pixel circuit PC3. In a plan view, the third light emitting element OLED3 may be adjacent to a lower side of the third pixel circuit PC3.

The light receiving elements LRE may include a plurality of first light receiving element LRE1 and a plurality of second light receiving elements LRE2 and LRE2-1. The first and second light receiving elements LRE1, LRE2, and LRE2-1 may be adjacent to the light emitting elements OLED.

Each of the first and second light receiving elements LRE1 and LRE2 may be disposed between the second light emitting elements OLED2 that are adjacent to each other in the first direction DR1, and between the first and third light emitting elements OLED1 and OLED3 that are adjacent to each other in the second direction DR2.

The second light receiving elements LRE2-1 may be spaced apart from the first light receiving elements LRE1 and adjacent to a boundary BNA between the display area DA and the non-display area NDA. The boundary BNA may extend in the first direction DR1. The boundary BNA may indicate a right-side boundary of the display area DA. The second light receiving elements LRE2 may be farther spaced apart from the boundary BNA than the second light receiving elements LRE2-1.

The second light receiving elements LRE2-1 may be adjacent to the first, second, and third light emitting elements OLED1, OLED2, and OLED3 that are disposed close to the boundary BNA. Each of the second light receiving elements LRE2-1 may be disposed between the second light emitting elements OLED2 that are close to the boundary BNA and are adjacent to each other in the first direction DR1.

Each of the sensing circuits SC may have a configuration substantially the same as that of the sensing circuit SC depicted in FIG. 12. The sensing circuits SC may be disposed below the first light receiving elements LRE1 to come into connection with the first and second light receiving elements LRE1, LRE2, and LRE2-1.

The sensing circuits SC may be correspondingly electrically connected to the first light receiving elements LRE1. The sensing circuits SC may be correspondingly electrically connected to the second light receiving elements LRE2 and LRE2-1. One sensing circuit SC may be electrically connected to a pair of first and second light receiving elements LRE1 and LRE2. Another sensing circuit SC may be electrically connected to a pair of first and second light receiving elements LRE1 and LRE2-1 that are adjacent to the boundary BNA. The second light receiving elements LRE2-1 may be correspondingly electrically connected to the sensing circuits SC that are electrically connected to the first light receiving elements LRE1 adjacent to the second light receiving elements LRE2-1.

The dummy circuit patterns DCT may be adjacent to the boundary BNA. The dummy circuit patterns DCT may be disposed below the second light receiving elements LRE2-1 and the second light emitting elements OLED2 that are adjacent to the boundary BNA. The dummy circuit patterns DCT may be close to the second light receiving elements LRE2-1 and the second light emitting elements OLED2 that are adjacent to the boundary BNA.

The dummy circuit patterns DCT might not be electrically connected to any of the second light receiving elements LRE2-1 and the second light emitting elements OLED2 that are adjacent to the boundary BNA. In addition, the dummy circuit patterns DCT might not be electrically connected to any of the first light receiving elements LRE1, the second light receiving elements LRE2, the first light emitting elements OLED1, and the third light emitting elements OLED3.

Each of the dummy circuit patterns DCT may partially overlap a corresponding one of the second light emitting elements OLED2 and a corresponding one of the second light receiving elements LRE2-1.

The following will discuss an arrangement between a single sensing circuit SC, a single first light receiving element LRE1, a single second light receiving element LRE2-1, and a single dummy circuit pattern DCT.

The first light receiving element LRE1 may be disposed on the sensing circuit SC. In a plan view, the first light receiving element LRE1 might not entirely overlap the sensing circuit SC. In a plan view, the first light receiving element LRE1 may disposed more to the left side than the sensing circuit SC.

The first light receiving element LRE1 may overlap a boundary between the second pixel circuit PC2 and the sensing circuit SC that are adjacent to each other. Therefore, a left section of the first light receiving element LRE1 may overlap the second pixel circuit PC2, and a right section of the first light receiving element LRE1 may overlap the sensing circuit SC. In a plan view, the first light receiving element LRE1 may be adjacent to a lower side of the sensing circuit SC.

In an $h^{th}$ row, the first light receiving element LRE1 and the second light receiving element LRE2-1 may be arranged in the second direction DR2, and the third light emitting element OLED3 adjacent to the boundary BNA may be disposed between the first light receiving element LRE1 and the second light receiving element LRE2-1. In an $(h+1)^{th}$ row, the first light receiving element LRE1 and the second light receiving element LRE2-1 may be arranged in the second direction DR2, and the first light emitting element OLED1 adjacent to the boundary BNA may be disposed between the first light receiving element LRE1 and the second light receiving element LRE2-1.

In each of the $h^{th}$ row and the $(h+1)^{th}$ row, the second light emitting element OLED2 adjacent to the boundary BNA may be spaced apart in the first direction DR1 from the second light receiving element LRE2-1.

The second light receiving element LRE2-1 and the second light emitting element OLED2 adjacent to the boundary BNA may overlap a boundary between the second pixel circuit PC2 and the dummy circuit pattern DCT. A left section of the second light emitting element OLED2 may overlap the second pixel circuit PC2, and a right section of the second light emitting element OLED2 may overlap the dummy circuit pattern DCT. A left section of the second light receiving element LRE2-1 may overlap the second pixel circuit PC2, and a right section of the second light receiving element LRE2-1 may overlap the dummy circuit pattern DCT.

Figure 14:
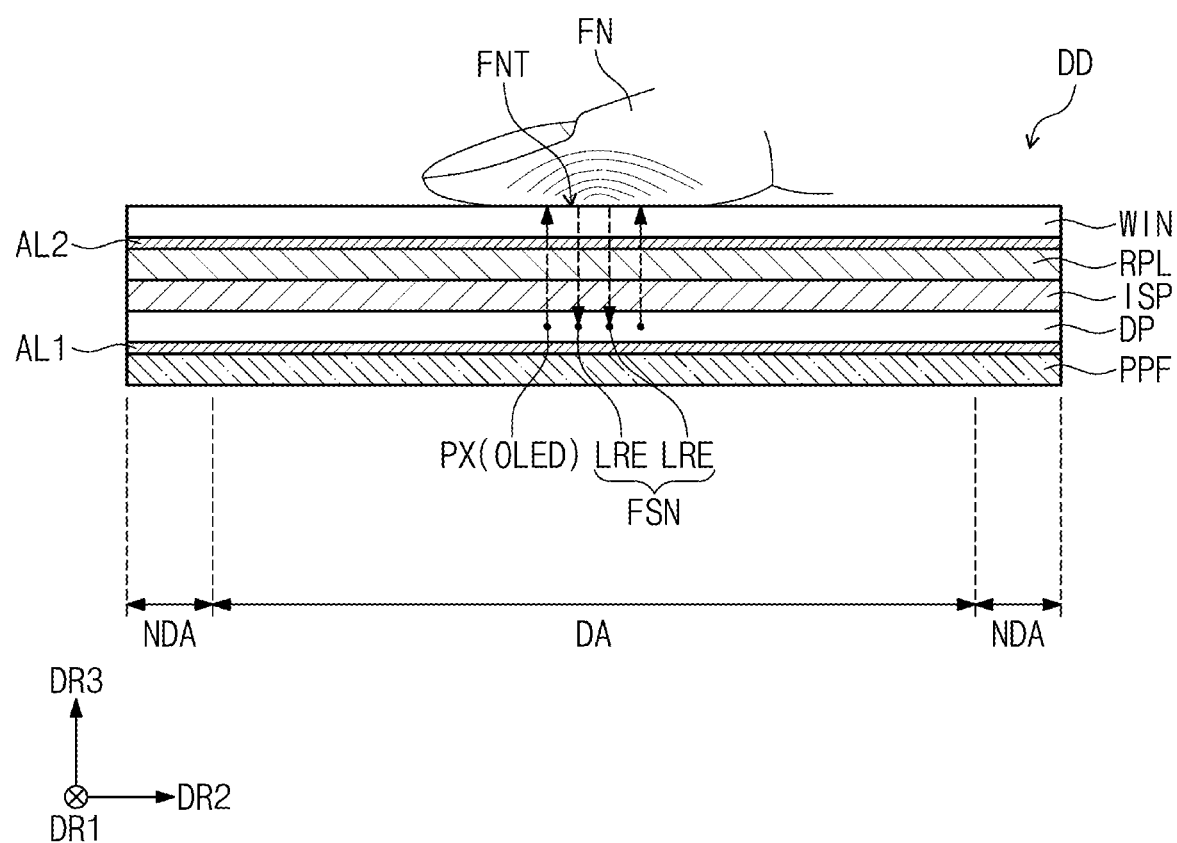
FIG. 14 is a cross-sectional view showing an example of fingerprint sensing state by the fingerprint sensors depicted in FIG. 13.

FIG. 14 is a cross-sectional view showing an example of fingerprint sensing state by the fingerprint sensors depicted in FIG. 13.

Referring to FIG. 14, the fingerprint sensors FSN may detect a fingerprint FNT of a finger FN provided on the display panel DP. The fingerprint FNT may be provided thereon with light generated from the light emitting elements OLED of the pixels PX disposed on the display area DA, and the light may be reflected from the fingerprint FNT.

The light reflected from the fingerprint FNT may be sensed by being provided to the light receiving elements LRE of the fingerprint sensors FSN. Therefore, the fingerprint sensor FSN may detect the fingerprint FNT through the light reflected from the fingerprint FNT. A control module of the display device DD may receive fingerprint information detected by the fingerprint sensor FSN, and may use the received fingerprint information to achieve a user authentication mode.

FIGS. 15 to 24 illustrate plan views showing a planar structure of a region AA depicted in FIG. 13.

FIGS. 15 to 24 will depict a sequential stack structure of the first and second pixel circuits PC1 and PC2, the first and second light emitting elements OLED1 and OLED2, the sensing circuit SC, the dummy circuit pattern DCT, and the first and second light receiving elements LRE1 and LRE2-1 disposed on the region AA. For example, FIGS. 15 to 24 partially show the first and second pixel circuits PC1 and PC2, the sensing circuit SC, and the dummy circuit pattern DCT.

Figure 15:
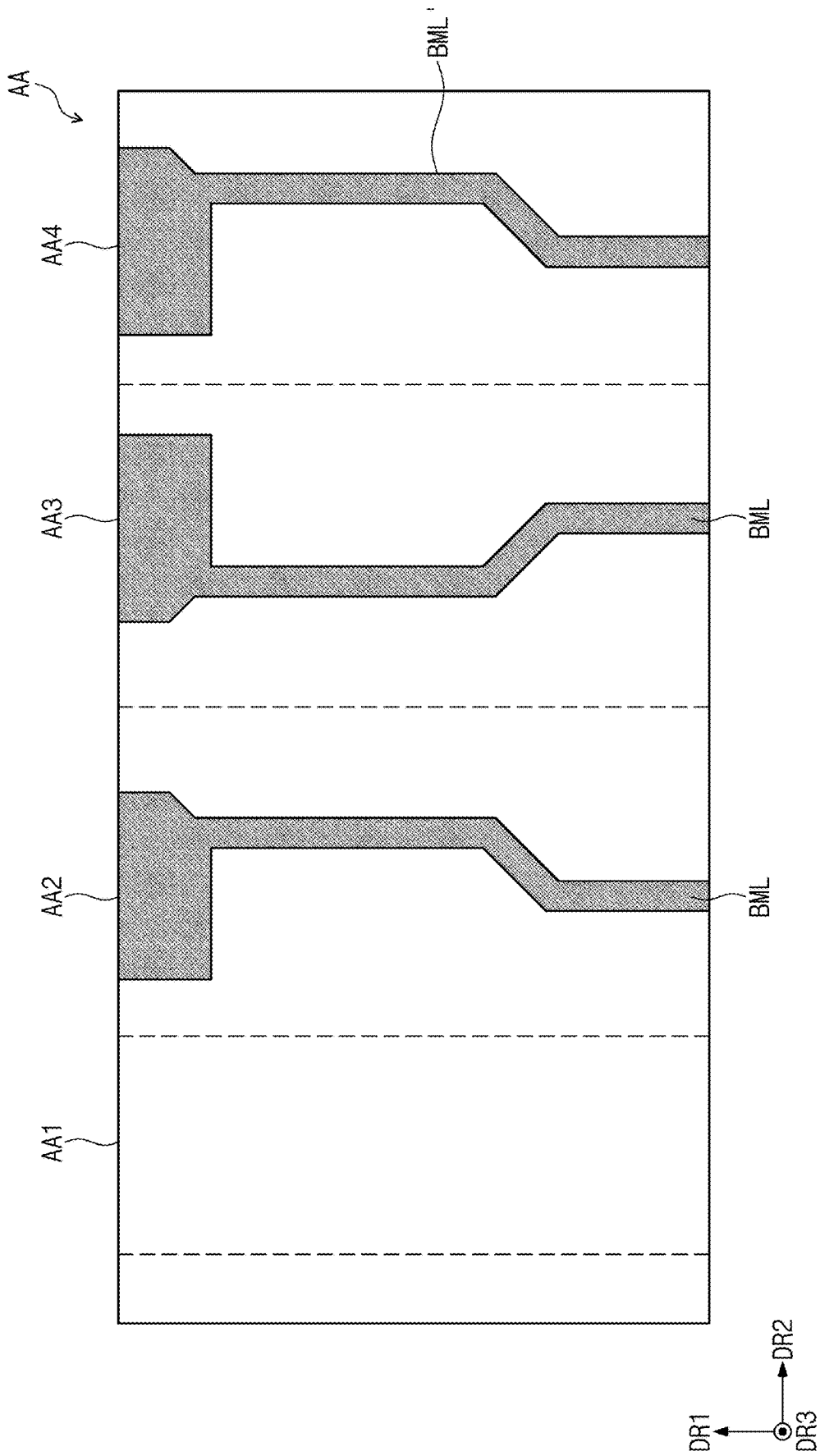
FIGS. 15 to 24 are plan views showing a planar structure of a region AA depicted in FIG. 3.

Referring to FIG. 15, the region AA may be divided into a first region AA1, a second region AA2, a third region AA3, and a fourth region AA4 that are arranged in the second direction DR2. The first region AA1, the second region AA2, the third region AA3, and the fourth region AA4 may be areas for forming the sensing circuit SC, the first pixel circuit PC1, the second pixel circuit PC2, and the dummy circuit pattern DCT, respectively.

In the following description, patterns disposed on the first region AA1 may be components of the sensing circuit SC, patterns disposed on the second region AA2 may be components of the first pixel circuit PC1, patterns disposed on the third region AA3 may be components of the second pixel circuit PC2, and patterns disposed on the fourth region AA4 may be components of the dummy circuit pattern DCT.

There will be exemplarily depicted in figures and discussed a configuration of some elements of the sensing circuit SC on the first region AA1, a configuration of some elements of the first and second pixel circuits PC1 and PC2 on the second and third regions AA2 and AA3, and a configuration of some elements of the dummy circuit pattern DCT on the fourth region AA4. For example, the following figures depict the second region AA2 includes a configuration of a portion of the first transistor T1 and a configuration of the second, third, fourth, and seventh transistors T2, T3, T4, and T7 of the first pixel circuit PC1, and omit a configuration of other elements of the first pixel circuit PC1 that are disposed on locations more outside than the second region AA2.

A plurality of dummy patterns BML and BML' depicted in FIG. 15 may be disposed on the substrate SUB illustrated in FIG. 7. For example, the dummy patterns BML and BML' may be shown in gray color. The dummy patterns BML and BML' may be formed of the same material by a concurrently performed patterning process at the same level, and may have various shapes without necessarily being limited to the shape depicted in FIG. 15. The dummy patterns BML may be disposed on the second region AA2 and the third region AA3. The dummy pattern BML' may be disposed on the fourth region AA4.

The dummy patterns BML may be the dummy pattern BML depicted in FIG. 7. The dummy patterns BML may substantially be patterns disposed below the first transistors T1 of the first and second pixel circuits PC1 and PC2 placed on the second and third regions AA2 and AA3. The dummy pattern BML' may have a shape symmetric with respect to that of the dummy pattern BML disposed on the third region AA3. The dummy patterns BML and BML' may be omitted.

The following description will focus on configuration of patterns on the second region AA2 because patterns on the third region AA3 are only symmetric with respect to, and have substantially the same configuration as that of, patterns on the second region AA2.

Hereinafter, thick solid lines and gray shading will be used to indicate patterns discussed in a relevant figure, and thin solid lines without shading will be used to indicate patterns formed in previous figures.

Figure 16:
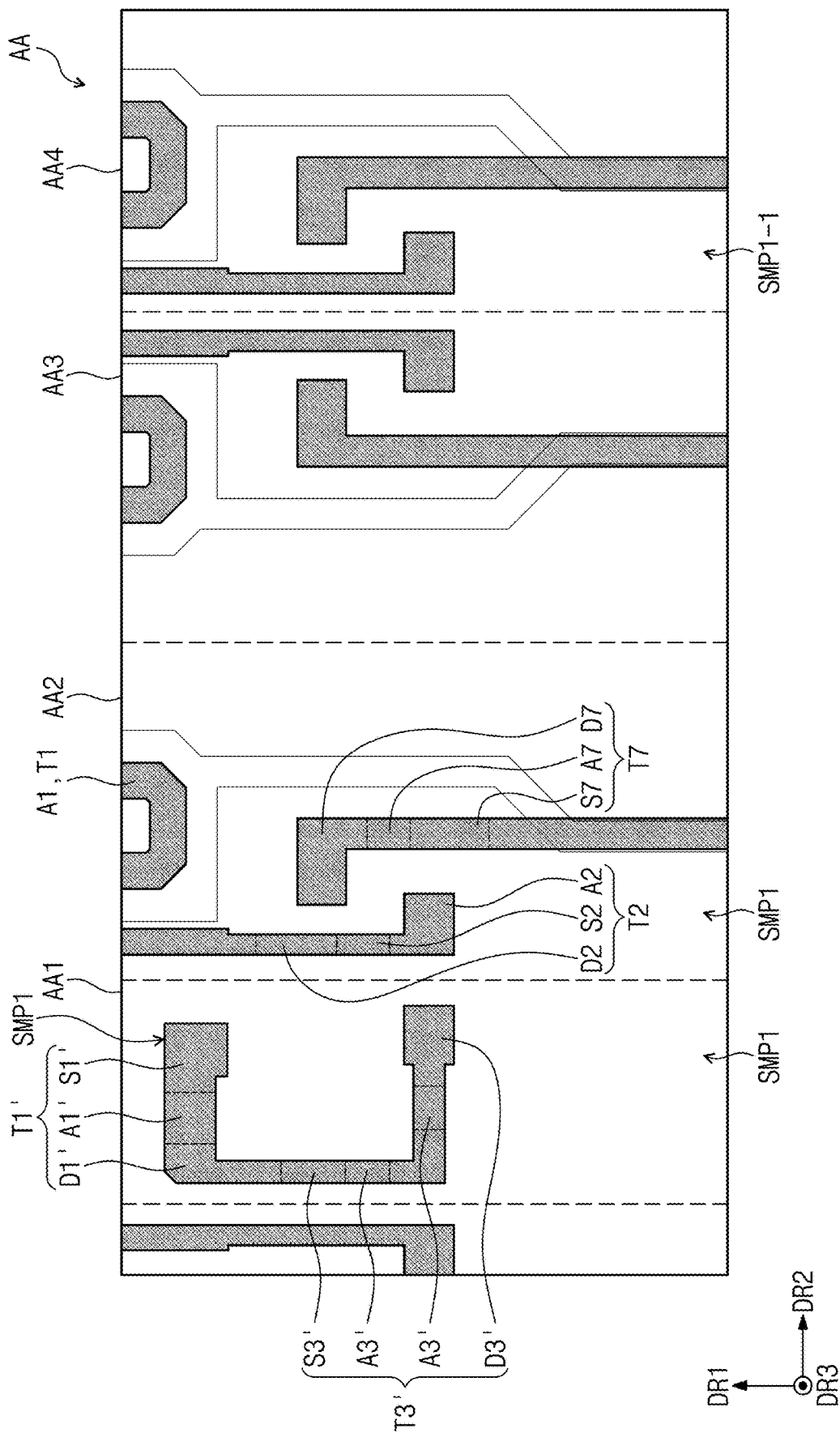

Referring to FIGS. 15 and 16, a plurality of first and first-first semiconductor patterns SMP1 and SMP1-1 may be disposed on the dummy patterns BML and BML'. The first and first-first semiconductor patterns SMP1 and SMP1-1 may be formed of the same material by a concurrently performed patterning process at the same level, and may have various shapes without necessarily being limited to the shape depicted in FIG. 16.

The first semiconductor patterns SMP1 may be disposed on the first, second, and third regions AA1, AA2, and AA3. The first semiconductor patterns SMP1 may be the first semiconductor patterns SMP1 depicted in FIG. 7. The first-first semiconductor patterns SMP1-1 may be disposed on the fourth region AA4.

The first semiconductor pattern SMP1 disposed on the first region AA1 may form source electrodes S1' and S3', drain electrodes D1' and D3', and active regions A1' and A3' of first and third transistors T1' and T3'. The source electrode S3' may be formed extending from the drain electrode D1'. The first semiconductor patterns SMP1 disposed on the second region AA2 may form active regions A1, A2, and A7, source electrodes S2 and S7, and drain electrodes D2 and D7 of first, second, and seventh transistors T1, T2, and T7.

The first semiconductor patterns SMP1 disposed on the third region AA3 might only be symmetric with respect to, and may have substantially the same configuration as that of, the first semiconductor patterns SMP1 disposed on the second region AA2. The first-first semiconductor pattern SMP1-1 might only be symmetric with respect to, and may have substantially the same configuration as that of, the first semiconductor pattern SMP1 disposed on the third region AA3.

Figure 17:
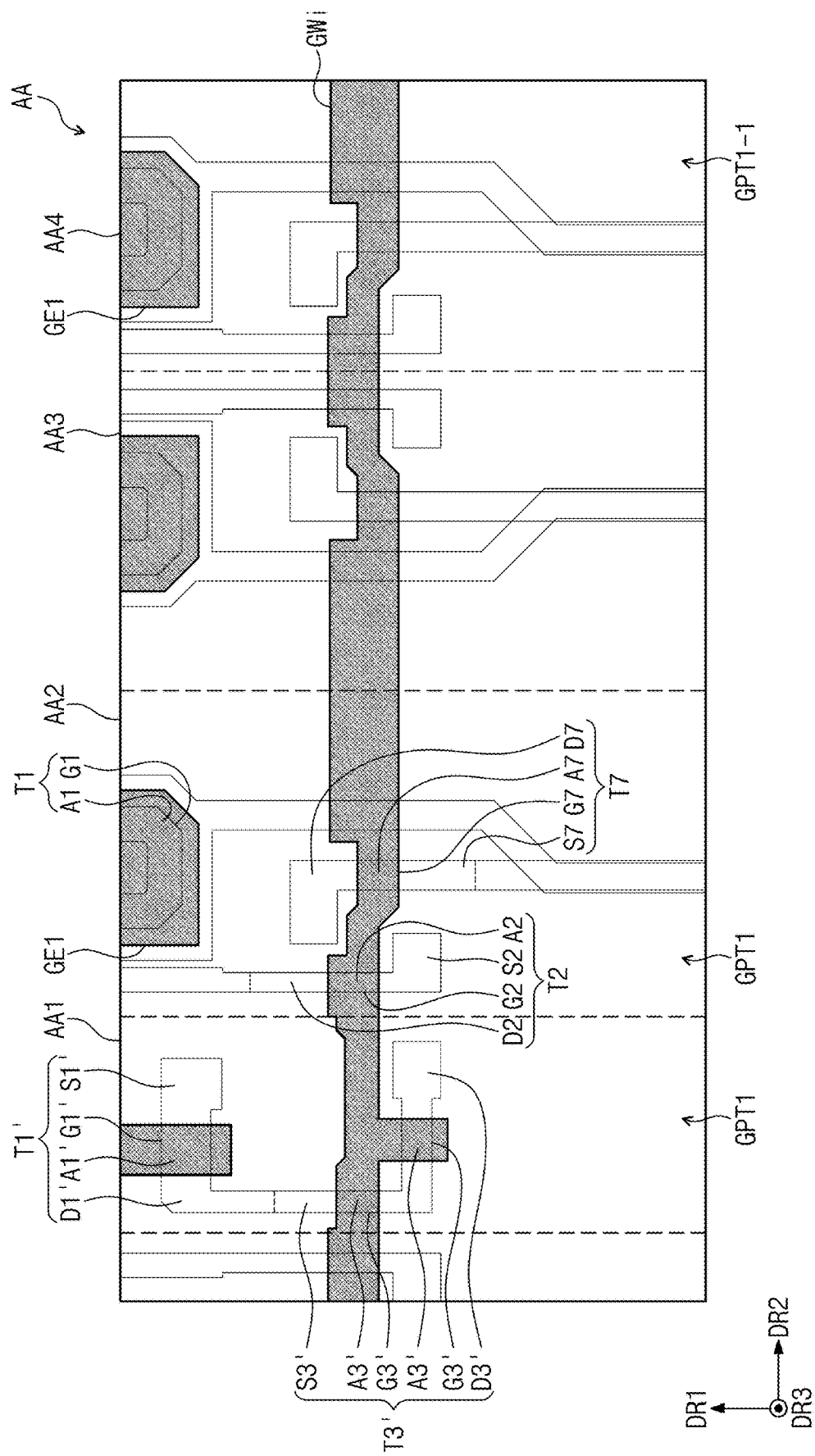

Referring to FIGS. 16 and 17, a plurality of first and first-first gate patterns GPT1 and GPT1-1 may be disposed on the first and first-first semiconductor patterns SMP1 and SMP1-1. The first and first-first gate patterns GPT1 and GPT1-1 may be structures located at the same level as that of the first gate patterns mentioned in FIG. 7. The first and first-first gate patterns GPT1 and GPT1-1 may be formed of the same material by a concurrently performed patterning process at the same level, and may have various shapes without necessarily being limited to the shape depicted in FIG. 17.

The first gate patterns GPT1 may be disposed on the first, second, and third regions AA1, AA2, and AA3. The first-first gate patterns GPT1-1 may be disposed on the fourth region AA4.

In a plan view, the first and first-first gate patterns GPT1 and GPT1-1 may partially overlap the first and first-first semiconductor patterns SMP1 and SMP1-1. The first and first-first gate patterns GPT1 and GPT1-1 may include a write scan line GW that extends in the second direction DR2 and a plurality of electrodes GE1 that are spaced apart in the first direction DR1 from the write scan line GW. The write scan line GW may be a pattern that corresponds to the write scan line GWi discussed above.

The first gate pattern GPT1 may be defined to indicate the write scan line GW disposed on the first, second, and third regions AA1, AA2, and AA3. The first-first gate pattern GPT1-1 may be defined to indicate the write scan line GW disposed on the fourth region AA4.

On the first region AA1, the electrode GE1 may form a gate electrode G1' of the first transistor T1'. The gate electrode G1' may overlap the active region A1'. On the second region AA2, the electrode GE1 may form a gate electrode G1 of the first transistor T1. The gate electrode G1 may be defined to indicate the electrode GE1 that overlaps the active region A1. On the second region AA2, the dummy pattern BML may overlap the gate electrode G1.

On the first and second regions AA1 and AA2, the write scan line GW may extend to intersect the first semiconductor patterns SMP1. The write scan line GW may form a gate electrode G3' of the third transistor T3' and gate electrodes G2 and G7 of the second and seventh transistors T2 and T7. The gate electrodes G3', G2, and G7 may be defined to indicate the write scan line GW that overlaps the first semiconductor patterns SMP1. The gate electrodes G3', G2, and G7 may correspondingly overlap the active regions A3', A2, and A7.

The first gate patterns GPT1 disposed on the third region AA3 might only be symmetric with respect to, and may have substantially the same configuration as that of, the first gate patterns GPT1 disposed on the second region AA2. The first-first gate patterns GPT1-1 might only be symmetric with respect to, and may have substantially the same configuration as that of, the first gate patterns GPT1 disposed on the third region AA3.

The seventh transistor T7 depicted in FIG. 17 may be the seventh transistor T7 of a next-layered pixel. The seventh transistor T7 of the next-layered pixel may be electrically connected to the write scan line GW of a current-layered pixel.

Figure 18:
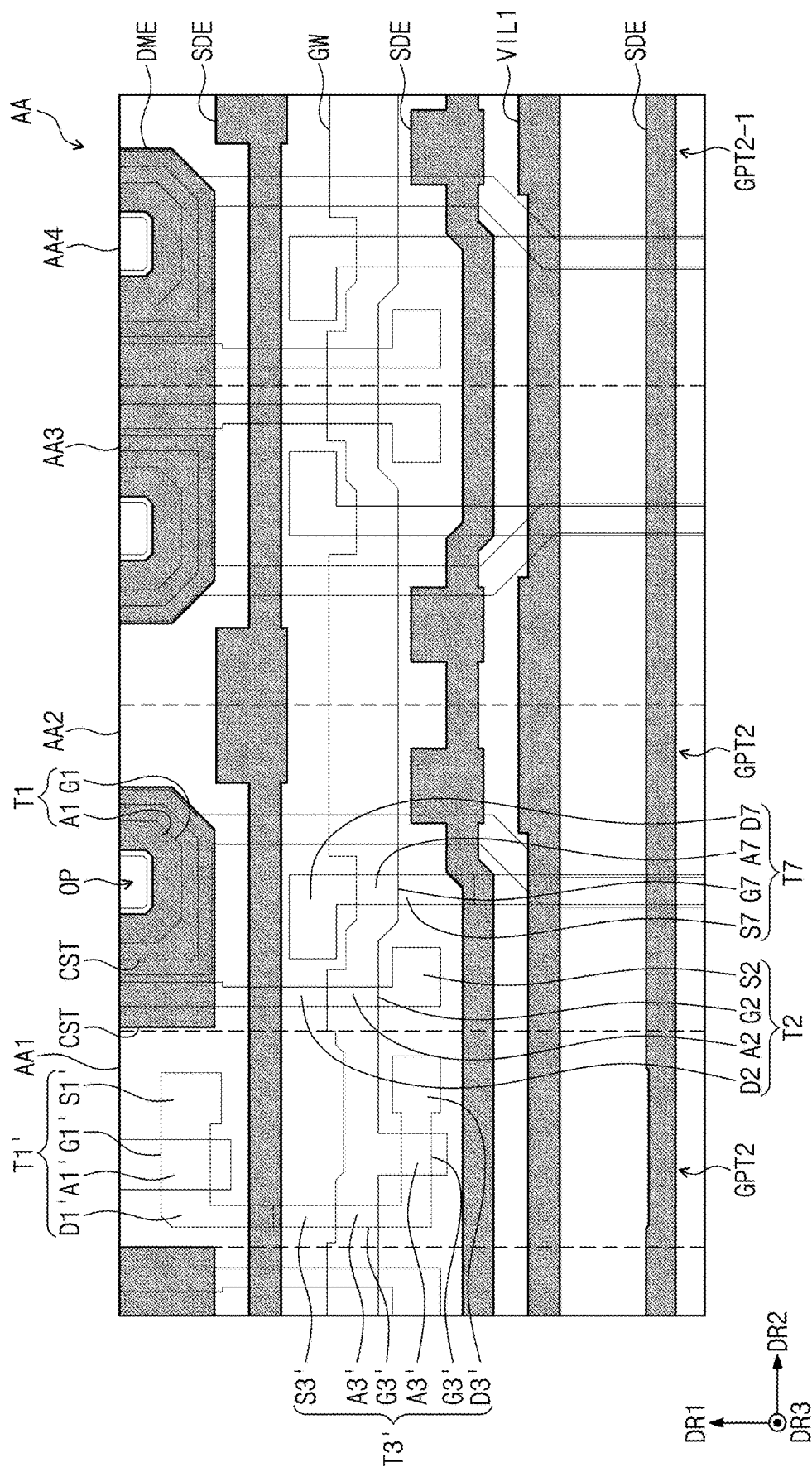
Figure 19:
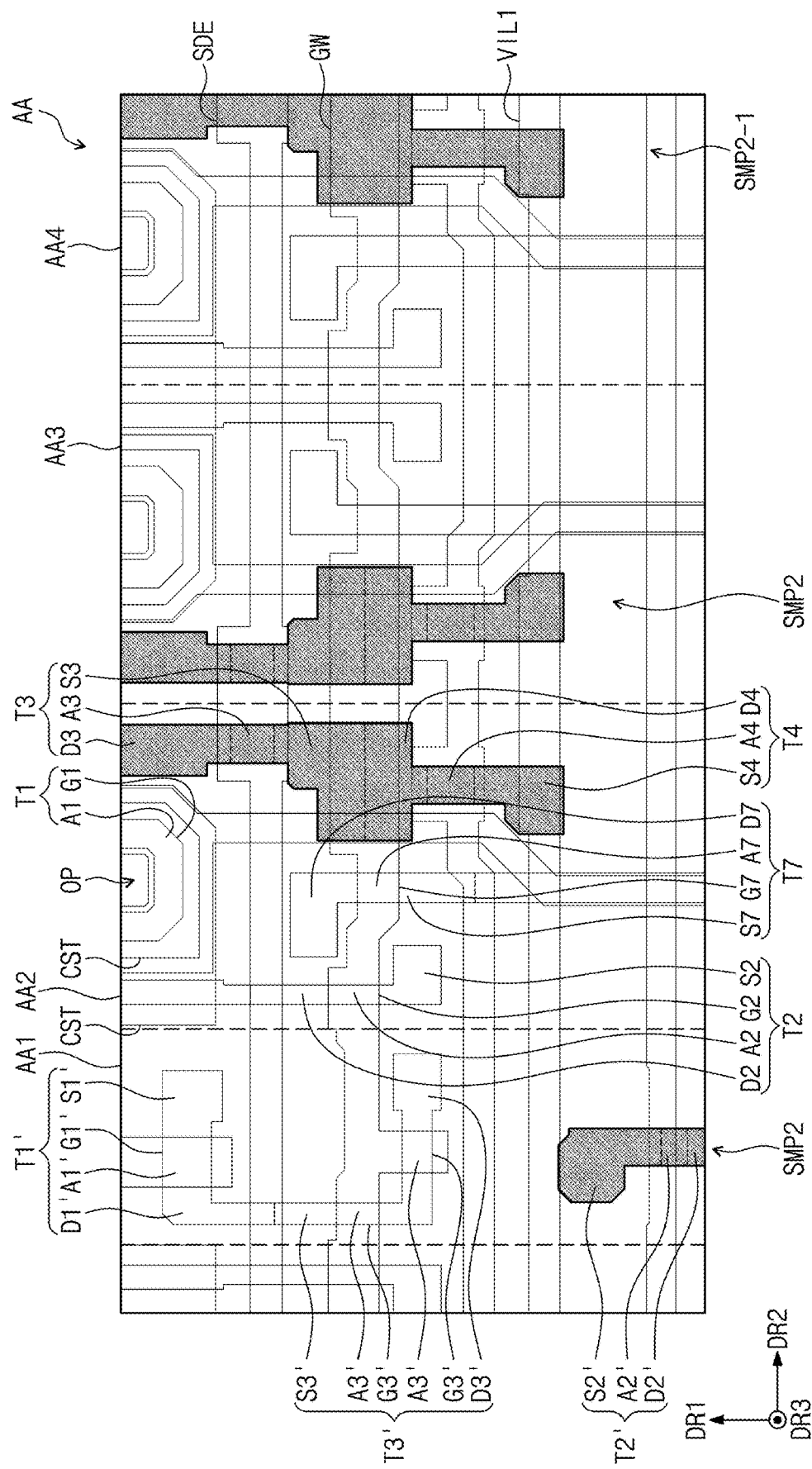

Referring to FIGS. 16 to 18, a plurality of second and second-first gate patterns GPT2 and GPT2-1 may be disposed on the first and first-first gate patterns GPT1 and GPT1-1. The second and second-first gate patterns GPT2 and GPT2-1 may be structures located at the same level as that of the second gate pattern mentioned in FIG. 7. The second and second-first gate patterns GPT2 and GPT2-1 may be formed of the same material by a concurrently performed patterning process at the same level, and may have various shapes without necessarily being limited to the shape depicted in FIG. 18.

The second gate patterns GPT2 may be disposed on the first, second, and third regions AA1, AA2, and AA3. The second-first gate patterns GPT2-1 may be disposed on the fourth region AA4.

The second and second-first gate patterns GPT2 and GPT2-1 may include a plurality of dummy electrodes DME, a plurality of sub-dummy electrodes SDE, and a first initialization line VIL1. The sub-dummy electrodes SDE and the first initialization line VIL1 may extend in the second direction DR2. The dummy electrodes DME, the sub-dummy electrodes SDE, and the first initialization line VIL1 may be spaced apart from each other in the first direction DR1.

Some of the sub-dummy electrodes SDE may be disposed between the dummy electrodes DME and the first initialization line VIL1. Another sub-dummy electrode SDE may be disposed closer than the first initialization line VIL1 to a lower side of the region AA.

The second gate pattern GPT2 may be defined to indicate the sub-dummy electrodes SDE and the first initialization line VIL1 that are disposed on the first, second, and third regions AA1, AA2, and AA3. The second-first gate pattern GPT2-1 may be defined to indicate the sub-dummy electrodes SDE and the first initialization line VIL1 that are disposed on the fourth regions AA4.

In a plan view, the dummy electrode DME disposed on the second region AA2 may partially overlap the gate electrode G1. An opening OP may be defined in the dummy electrode DME. The dummy electrode DME and the gate electrode G1 that overlap each other may constitute a capacitor CST discussed above.

Figure 20:
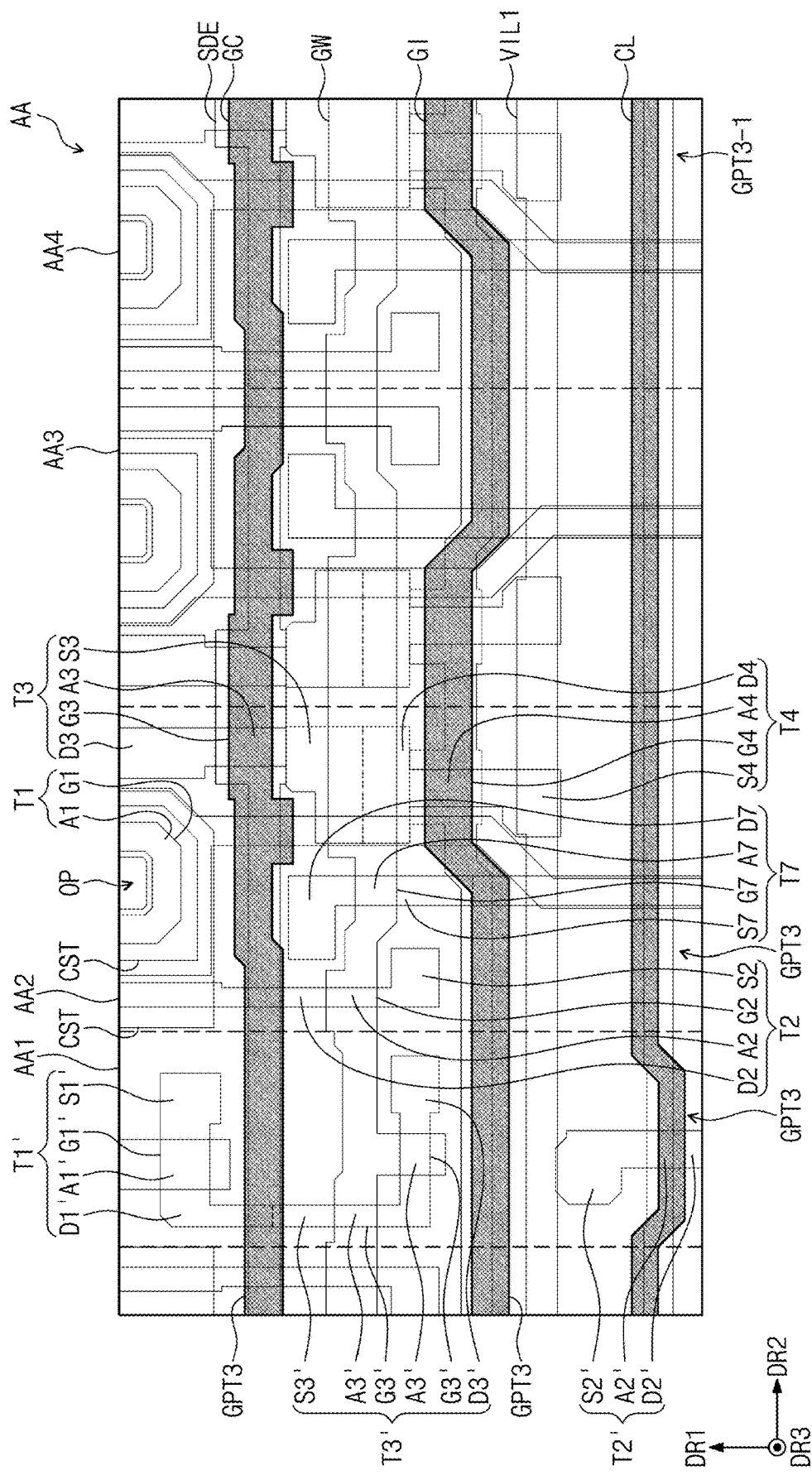

The sub-dummy electrode SDE may overlap each of a compensation scan line GC, an initialization scan line GI, and a control line CL which will be discussed below in FIG. 20.

The second gate patterns GPT2 disposed on the third region AA3 might only be symmetric with respect to, and may have substantially the same configuration as that of, the second gate patterns GPT2 disposed on the second region AA2. The second-first gate patterns GPT2-1 might only be symmetric with respect to, and may have substantially the same configuration as that of, the second gate patterns GPT2 disposed on the third region AA3.

Referring to FIGS. 16 to 19, the second and second-first gate patterns GPT2 and GPT2-1 may be provided thereon with a plurality of second and second-first semiconductor patterns SMP2 and SMP2-1 that extend in a vertical direction and are spaced apart from each other in the second direction DR2. The second and second-first semiconductor patterns SMP2 and SMP2-1 may be formed of the same material by a concurrently performed patterning process at the same level, and may have various shapes without necessarily being limited to the shape depicted in FIG. 19.

The second semiconductor patterns SMP2 may be disposed on the first, second, and third regions AA1, AA2, and AA3. The second semiconductor patterns SMP2 may be the second semiconductor patterns SMP2 depicted in FIG. 7. The second-first semiconductor patterns SMP2-1 may be disposed on the fourth region AA4.

The second semiconductor pattern SMP2 disposed on the first region AA1 may form a source electrode S2', a drain electrode D2', and active region A2' of a second transistor T2'. The second transistor T2' depicted in FIG. 19 may be a configuration of a next-layered fingerprint sensor FSN.

The second semiconductor pattern SMP2 disposed on the second region AA2 may form source electrodes S3 and S4, drain electrodes D3 and D4, and active regions A3 and A4 of third and fourth transistors T3 and T4. The drain electrode D4 may be formed extending from the source electrode S3.

The second semiconductor patterns SMP2 disposed on the third region AA3 might only be symmetric with respect to, and may have substantially the same configuration as that of, the second semiconductor patterns SMP2 disposed on the second region AA2. The second-first semiconductor pattern SMP2-1 might only be symmetric with respect to, and may have substantially the same configuration as that of, the second semiconductor pattern SMP2 disposed on the third region AA3.

Referring to FIGS. 16 to 20, a plurality of third and third-first gate patterns GPT3 and GPT3-1 may be disposed on the second and second-first semiconductor patterns SMP2 and SMP2-1. The third and third-first gate patterns GPT3 and GPT3-1 may be structures located at the same level as that of the third gate pattern mentioned in FIG. 7. The third and third-first gate patterns GPT3 and GPT3-1 may be formed of the same material by a concurrently performed patterning process at the same level, and may have various shapes without necessarily being limited to the shape depicted in FIG. 20.

The third gate patterns GPT3 may be disposed on the first, second, and third regions AA1, AA2, and AA3. The third-first gate patterns GPT3-1 may be disposed on the fourth region AA4.

In a plan view, the third and third-first gate patterns GPT3 and GPT3-1 may partially overlap the second and second-first semiconductor patterns SMP2 and SMP2-1. The third and third-first gate patterns GPT3 and GPT3-1 may include a compensation scan line GC, an initialization scan line GI, and a control line CL that extend in the second direction DR2 and are spaced apart from each other in the first direction DR1. The compensation scan line GC, the initialization scan line GI, and the control line CL may correspond to the $i^{th}$ compensation scan line GCi, the $i^{th}$ initialization scan line GIi, and the $i^{th}$ control line CLi, respectively.

The third gate pattern GPT3 may be defined to indicate the compensation scan line GC, the initialization scan line GI, and the control line CL that are disposed on the first, second, and third regions AA1, AA2, and AA3. The third-first gate pattern GPT3-1 may be defined to indicate the compensation scan line GC, the initialization scan line GI, and the control line CL that are disposed on the fourth region AA4.

The third gate pattern GPT3 may form a gate electrode G2' of the second transistor T2', a gate electrode G3 of the third transistor T3, and a gate electrode G4 of the fourth transistor T4.

On the second region AA2, the compensation scan line GC may form the gate electrode G3 of the third transistor T3. On the second region AA2, the gate electrode G3 may be defined to indicate the compensation scan line GC that overlaps the second semiconductor pattern SMP2. In a plan view, the gate electrode G3 may overlap the active region A3.

On the second region AA2, the initialization scan line GI may form the gate electrode G4 of the fourth transistor T4. On the second region AA2, the gate electrode G4 may be defined to indicate the initialization scan line GI that overlaps the second semiconductor pattern SMP2. In a plan view, the gate electrode G4 may overlap the active region A4.

The sub-dummy electrode SDE may overlap each of the compensation scan line GC, the initialization scan line GI, and the control line CL.

On the first region AA1, the control line C may form the gate electrode G2' of the second transistor T2'. On the first region AA1, the gate electrode G2' may be defined to indicate the control line CL that overlaps the second semiconductor pattern SMP2. In a plan view, the gate electrode G2' may overlap the active region A2'.

The third gate patterns GPT3 disposed on the third region AA3 might only be symmetric with respect to, and may have substantially the same configuration as that of, the third gate patterns GPT3 disposed on the second region AA2. The third-first gate patterns GPT3-1 might only be symmetric with respect to, and may have substantially the same configuration as that of, the third gate patterns GPT3 disposed on the third region AA3.

For brevity of illustration, the following FIGS. 21 to 24 will show symbols indicating the transistors, but omit symbols indicating the source electrodes, the drain electrodes, the active regions, and the gate electrodes. The symbols indicating the source electrodes, the drain electrodes, the active regions, and the gate electrodes will be explained with reference to FIGS. 16 to 20.

Referring to FIGS. 16 to 21, a plurality of first and first-first connection patterns CNP1 and CNP1-1 may be disposed on the third and third-first gate patterns GPT3 and GTP3-1. The first and first-first connection patterns CNP1 and CNP1-1 may be located at the same level as that of the first connection electrode CNE1 depicted in FIG. 7. The first and first-first connection patterns CNP1 and CNP1-1 may be formed of the same material by a currently performed patterning process at the same level, and may have various shapes without necessarily being limited to the shape depicted in FIG. 21.

The first connection patterns CNP1 may be disposed on the first, second, and third regions AA1, AA2, and AA3. The first-first connection patterns CNP1-1 may be disposed on the fourth region AA4.

The first and first-first connection patterns CNP1 and CNP1-1 may include a plurality of first connection electrodes CNE1-1 to CNE1-5, a second initialization line VIL2, and a first reset line RSL1.

The second initialization line VIL2 and the first reset line RSL1 may extend in the second direction DR2 and may be spaced apart from each other in the first direction DR1. The first connection patterns CNP1 may be defined to indicate the second initialization line VIL2 and the first reset line RSL1 that are disposed on the first, second, and third regions AA1, AA2, and AA3. The first-first connection patterns CNP1-1 may be defined to indicate the second initialization line VIL2 and the first reset line RSL1 that are disposed on the fourth region AA4.

A plurality of first contact holes CH1-1 to CH1-8 may be defined. The first contact holes CH1-1 to CH1-8 may be formed identically to the first contact hole CH1 depicted in FIG. 7.

The first connection electrode CNE1-1 may be electrically connected through the first contact holes CH1-1 to the source electrode S3 of the third transistor T3 and to the gate electrode G1 of the first transistor T1. The dummy electrode DME may have the opening OP that is formed to expose the gate electrode G1. As the first contact hole CH1-1 is formed in the opening OP, the first connection electrode CNE1-1 may be easily electrically connected to the gate electrode G1. The third transistor T3 may be electrically connected through the first connection electrode CNE1-1 to the first transistor T1.

The first connection electrode CNE1-2 may be electrically connected through the first contact hole CH1-2 to the drain electrode D3 of the third transistor T3. The drain electrode D3 of the third transistor T3 may be electrically connected through the first connection electrode CNE1-2 to the drain electrode D1 of the first transistor T1.

The first connection electrode CNE1-3 may be electrically connected through first contact holes CH1-3 to the first initialization line VIL1 and the source electrode S4 of the fourth transistor T4. The fourth transistor T4 may be electrically connected through the first connection electrode CNE1-3 to the first initialization line VIL1.

The first connection electrode CNE1-4 may be electrically connected through the first contact hole CH1-4 to the source electrode S2 of the second transistor T2. The first connection electrode CNE1-4 may be electrically connected to a data line DL which will be depicted in FIG. 22.

The second initialization line VIL2 may be electrically connected through the first contact hole CH1-5 to the drain electrode D7 of the seventh transistor T7. The second initialization line VIL2 may be electrically connected through the first contact hole CH1-6 to the source electrode S1' of the first transistor T1'.

The first connection electrode CNE1-5 may be electrically connected through the first contact hole CH1-7 to the drain electrode D3' of the third transistor T3'. The first connection electrode CNE1-5 may be electrically connected to a receiving line RX which will be depicted in FIG. 22.

The first reset line RSL1 may be electrically connected through the first contact hole CH1-8 to the source electrode S2' of the second transistor T2'. The first reset line RSL1 may be electrically connected to a second reset line RSL2 which will be depicted in FIG. 22.

The first connection patterns CNP1 disposed on the third region AA3 might only be symmetric with respect to, and may have substantially the same configuration as that of, the first connection patterns CNP1 disposed on the second region AA2. The first-first connection patterns CNP1-1 might only be symmetric with respect to, and may have substantially the same configuration as that of, the first connection patterns CNP1 disposed on the third region AA3.

Figure 21:
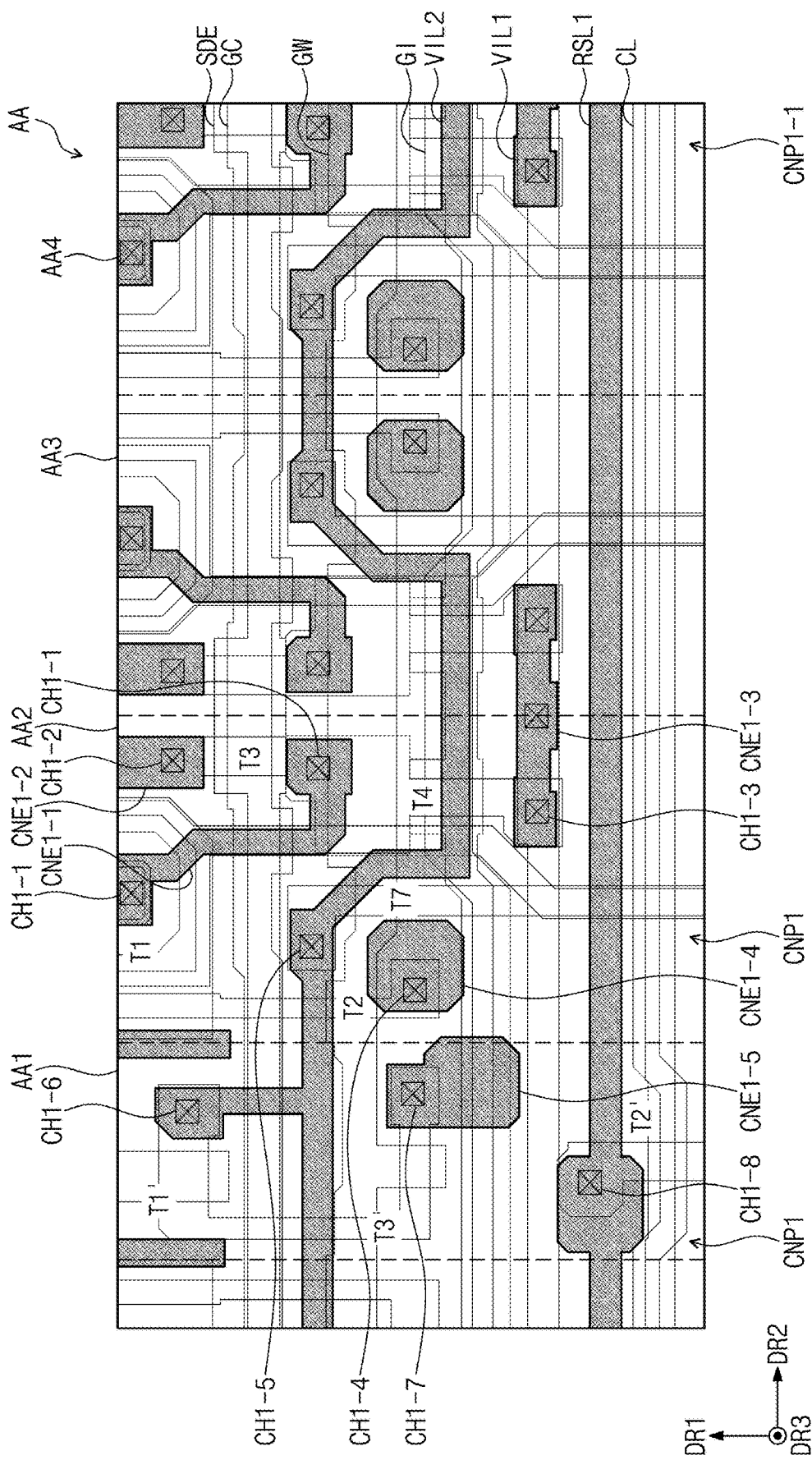

Hereinafter, FIG. 22 omits illustration of the first contact holes CH1-1 to CH1-8 depicted in FIG. 21.

Referring to FIGS. 16 to 22, a plurality of second and second-first connection patterns CNP2 and CNP2-1 may be disposed on the first and first-first connection patterns CNP1 and CNP1-1. The second and second-first connection patterns CNP2 and CNP2-1 may be located at the same level as that of the second connection electrode CNE2 depicted in FIG. 7. The second and second-first connection patterns CNP2 and CNP2-1 may be formed of the same material by a currently performed patterning process at the same level, and may have various shapes without necessarily being limited to the shape depicted in FIG. 22.

The second connection patterns CNP2 may be disposed on the first, second, and third regions AA1, AA2, and AA3. The second-first connection patterns CNP2-1 may be disposed on the fourth region AA4.

The second connection patterns CNP2 may include a first power line PL1, a data line DL, a receiving line RX, a second reset line RSL2, and a second connection electrode CNE2-1. The data line DL may correspond to the $j^{th}$ data line DLj discussed above. The second-first connection patterns CNP2-1 may include a dummy data line DDL and a dummy power line DPL1. The dummy data line DDL and the dummy power line DPL1 may be integrally formed with each other as a singular element.

A plurality of second contact holes CH2-1 to CH2-3 may be defined. The second contact holes CH2-1 to CH2-3 may be formed identically to the second contact hole CH2 depicted in FIG. 7.

The first power line PL1 may be electrically connected to a fifth transistor T5. The data line DL may be electrically connected through the second contact hole CH2-1 to the first connection electrode CNE1-4. The data line DL may be electrically connected through the first connection electrode CNE1-4 to the second transistor T2.

The receiving line RX may be electrically connected through the second contact hole CH2-2 to the first connection electrode CNE1-5. The receiving line RX may be electrically connected through the first connection electrode CNE1-5 to the third transistor T3'.

Figure 22:
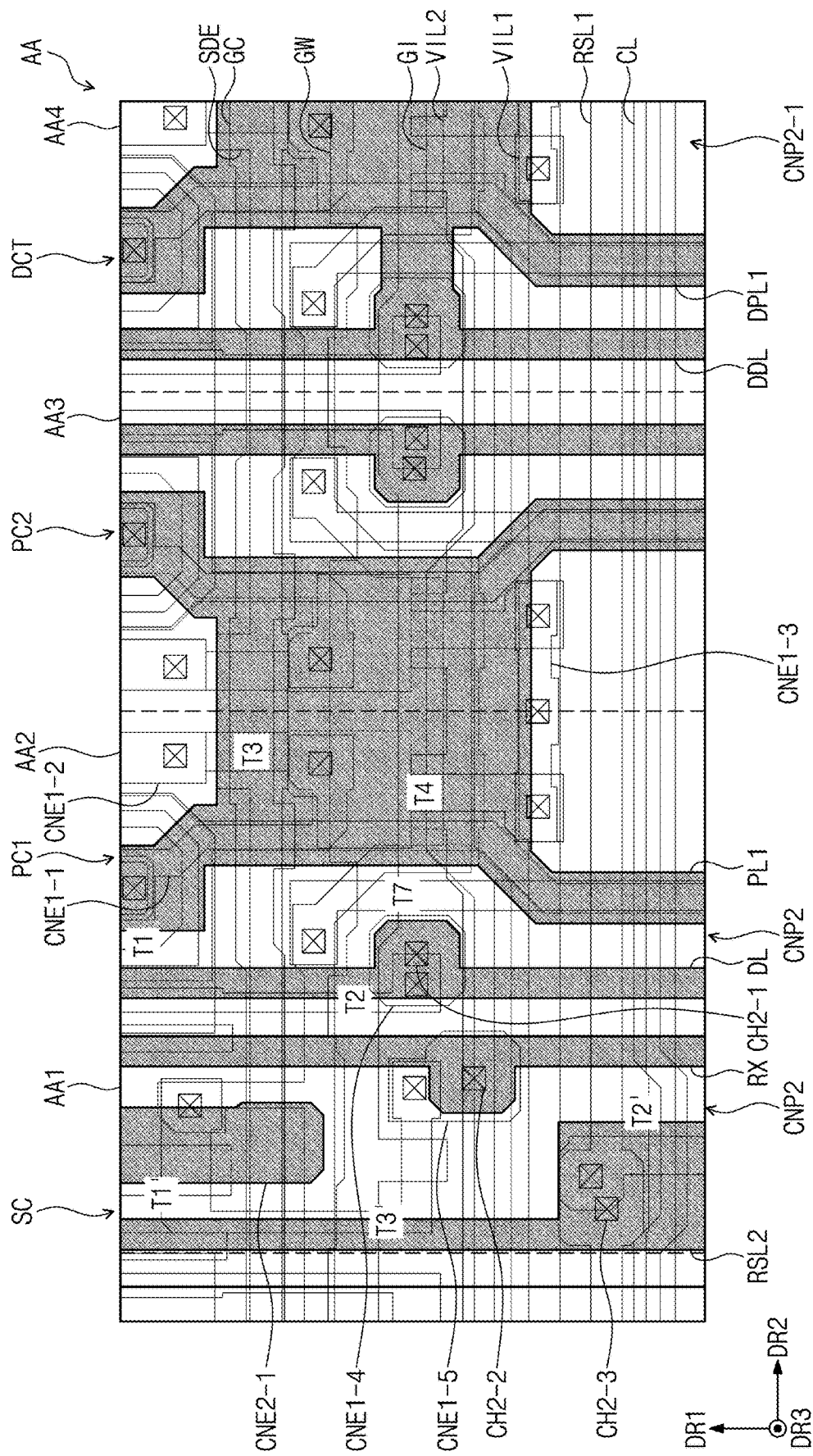
Figure 23:
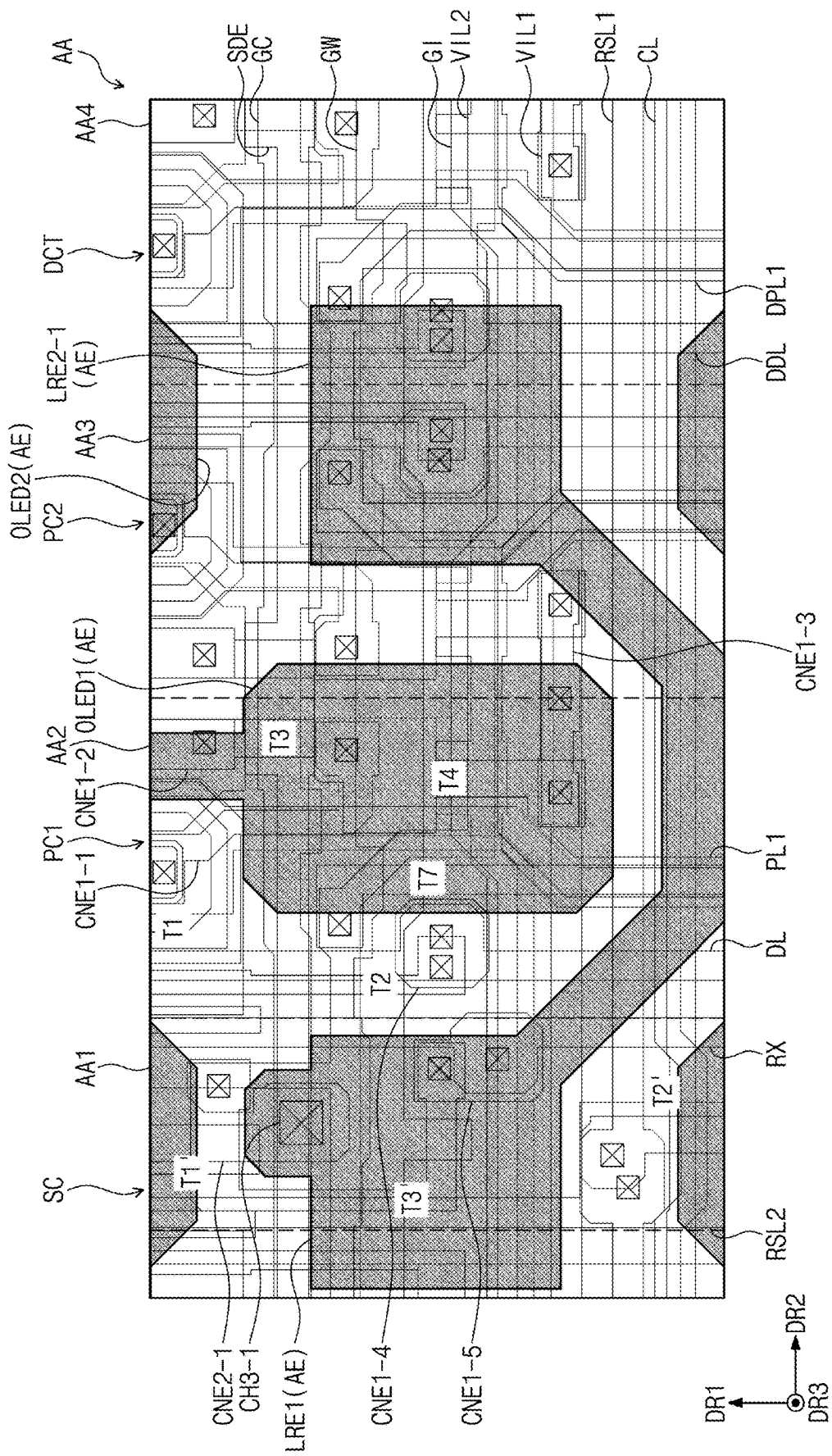
Figure 24:
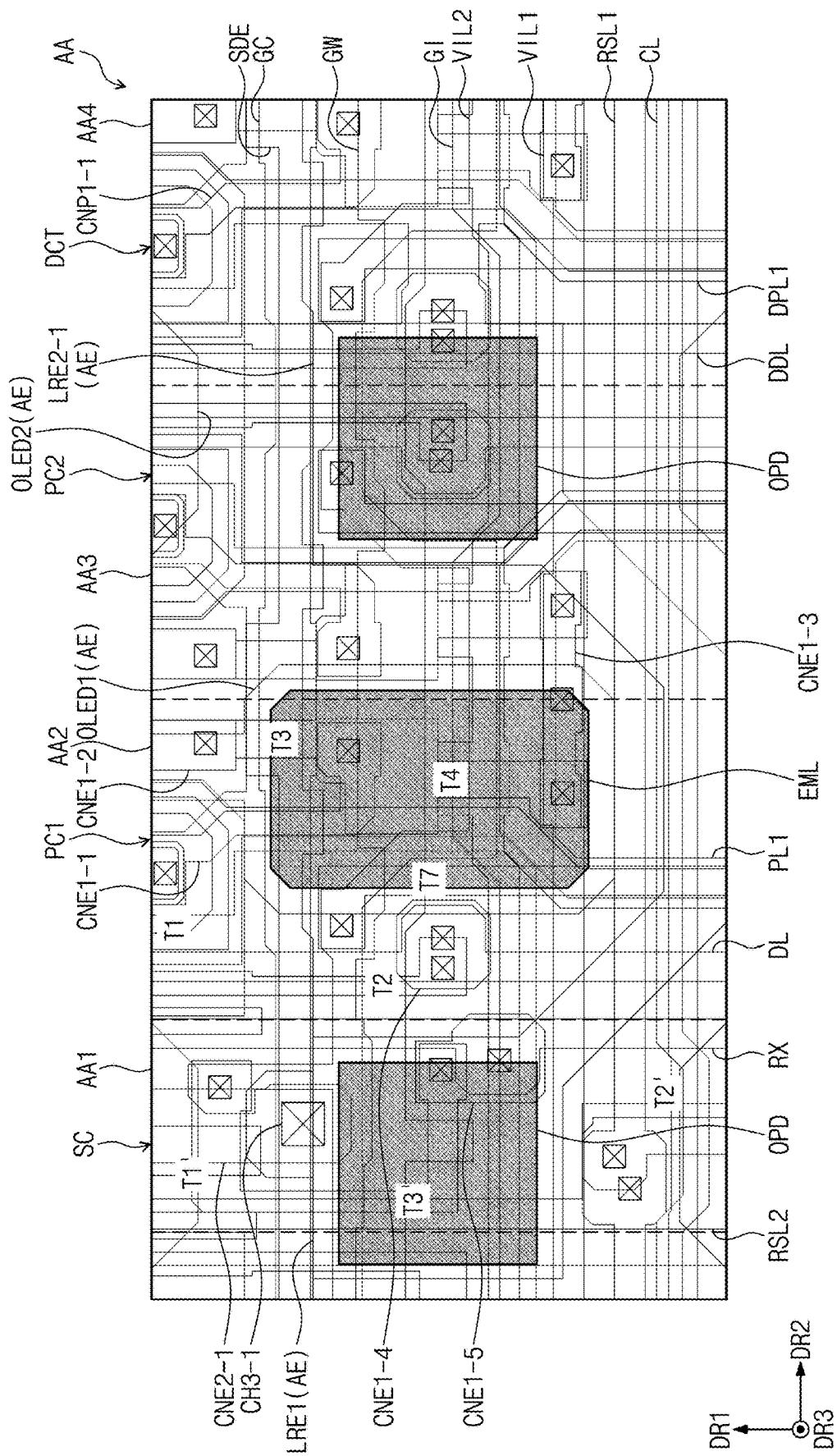

The second connection electrode CNE2-1 may be electrically connected to a first electrode AE of a first light receiving element LRE1 which will be depicted in FIG. 23. On a location above a section depicted in FIG. 22, there may be disposed a first gate pattern GPT1 that forms a gate electrode G1' of the first transistor T1' and also disposed a second transistor T2' of a current-layered fingerprint sensor FSN.

The second connection electrode CNE2-1 may be electrically connected to the first gate pattern GPT1 that forms the gate electrode G1' of the first transistor T1' and to the drain electrode D2' of the second transistor T2', thereby connecting the first transistor T1' and the second transistor T2' to each other.

The second reset line RSL2 may be electrically connected through the second contact hole CH2-3 to the first reset line RSL1. The second reset line RSL2 may receive the reset voltage VRST discussed above.

The second connection patterns CNP2 disposed on the third region AA3 might only be symmetric with respect to, and may have substantially the same configuration as that of, the second connection patterns CNP2 disposed on the second region AA2.

The dummy data line DDL may have a shape symmetric with respect to that of the data line DL disposed on the third region AA3. The dummy power line DPL1 may have a shape symmetric with respect to that of the first power line PL1 disposed on the third region AA3. Therefore, the second-first connection patterns CNP2-1 might only be symmetric with respect to, and may have substantially the same configuration as that of, the second connection patterns CNP2 disposed on the third region AA3.

A portion of the dummy data line DDL may extend toward the dummy power line DPL1, and the portion of the dummy data line DDL and the dummy power line DPL1 may be formed into a single unitary body. The dummy power line DPL1 and the first power line PL1 may receive the first voltage ELVDD.

The patterns depicted in FIGS. 15 to 22 may form a sensing circuit SC on the first region AA1, a first pixel circuit PC1 on the second region AA2, a second pixel circuit PC2 on the third region AA3, and a dummy circuit pattern DCT on the fourth region AA4. Therefore, the dummy circuit pattern DCT may have a structure symmetric with respect to that of the second pixel circuit PC2. The dummy circuit pattern DCT may have a structure similar to that of the first pixel circuit PC1.

As the first voltage ELVDD is applied to the dummy power line DPL1, the dummy circuit pattern DCT may receive the first voltage ELVDD. When the dummy circuit pattern DCT is in a floated state without receiving the first voltage ELVDD, the dummy circuit pattern DCT may induce static electricity. In an embodiment of the present invention, the first voltage ELVDD may be applied to the dummy circuit pattern DCT. When a constant voltage is applied to the dummy circuit pattern DCT, no electrostatic induction may occur.

Hereinafter, FIG. 23 omits illustration of the second contact holes CH2-1 to CH2-3 depicted in FIG. 22.

Referring to FIGS. 16 to 23, first electrodes AE may be disposed on the second and second-first connection patterns CNP2 and CNP2-1. The first region AA1 may be provided thereon with the first electrode AE of a first light receiving element LRE1, the second region AA2 may be provided thereon with the first electrode AE of a first light emitting element OLED1, and the third and fourth regions AA3 and AA4 may be provided thereon with the first electrode AE of a second light receiving element LRE2-1.

A third contact hole CH3-1 may be defined, and the third contact hole CH3-1 may be formed identically to the third contact hole CH3 depicted in FIG. 7.

The first electrode AE disposed on the first region AA1 may be electrically connected the third contact hole CH3-1 to the second connection electrode CNE2-1 depicted in FIG. 22. The first electrode AE disposed on the first region AA1 may be electrically connected to the first electrode AE disposed on the third and fourth regions AA3 and AA4. The first electrode AE disposed on the second region AA2 may be electrically connected to a sixth transistor T6 for driving the first light emitting element OLED1.

In addition, the first electrode AE of a second light emitting element OLED2 disposed in an upper side of the third region AA3 may be electrically connected to the sixth transistor T6 for driving the second light emitting element OLED2.

Referring to FIGS. 16 to 24, the first electrodes AE may be provided thereon with an emission layer EML of the first light emitting element OLED1 and with light receiving layers OPD of the first and second light receiving elements LRE1 and LRE2-1.

The first pixel circuit PC1 may be disposed on a right side of the first light receiving element LRE1. The dummy circuit pattern DCT may be disposed on a right side of the second light receiving element LRE2-1. The dummy circuit pattern DCT may have a pattern similar to that of the first pixel circuit PC1.

The first light receiving element LRE1 may be affected by parasitic capacitors formed by patterns of the first pixel circuit PC1. The second light receiving element LRE2-1 may be affected by parasitic capacitors formed by the dummy circuit pattern DCT.

When the first pixel circuit PC1 is disposed on a right side of the first light receiving element LRE1, and when the dummy circuit pattern DCT is not disposed on a right side of the second light receiving element LRE2-1, the parasitic capacitors that affect the first light receiving element LRE1 may be different from the parasitic capacitors that affect the second light receiving element LRE2-1. In this case, the fingerprint sensors FSN may have different sensitivities from each other.

In an embodiment of the present invention, the second light receiving element LRE2-1 may be provided on its right side with the dummy circuit pattern DCT similar to the first pixel circuit PC1. In this case, the parasitic capacitors that affect the first light receiving element LRE1 may be formed similarly to the parasitic capacitors that affect the second light receiving element LRE2-1. Therefore, the fingerprint sensors FSN may have uniform sensitivities, which may result in an increase in sensing uniformity of the fingerprint sensors FSN.

Figure 25:
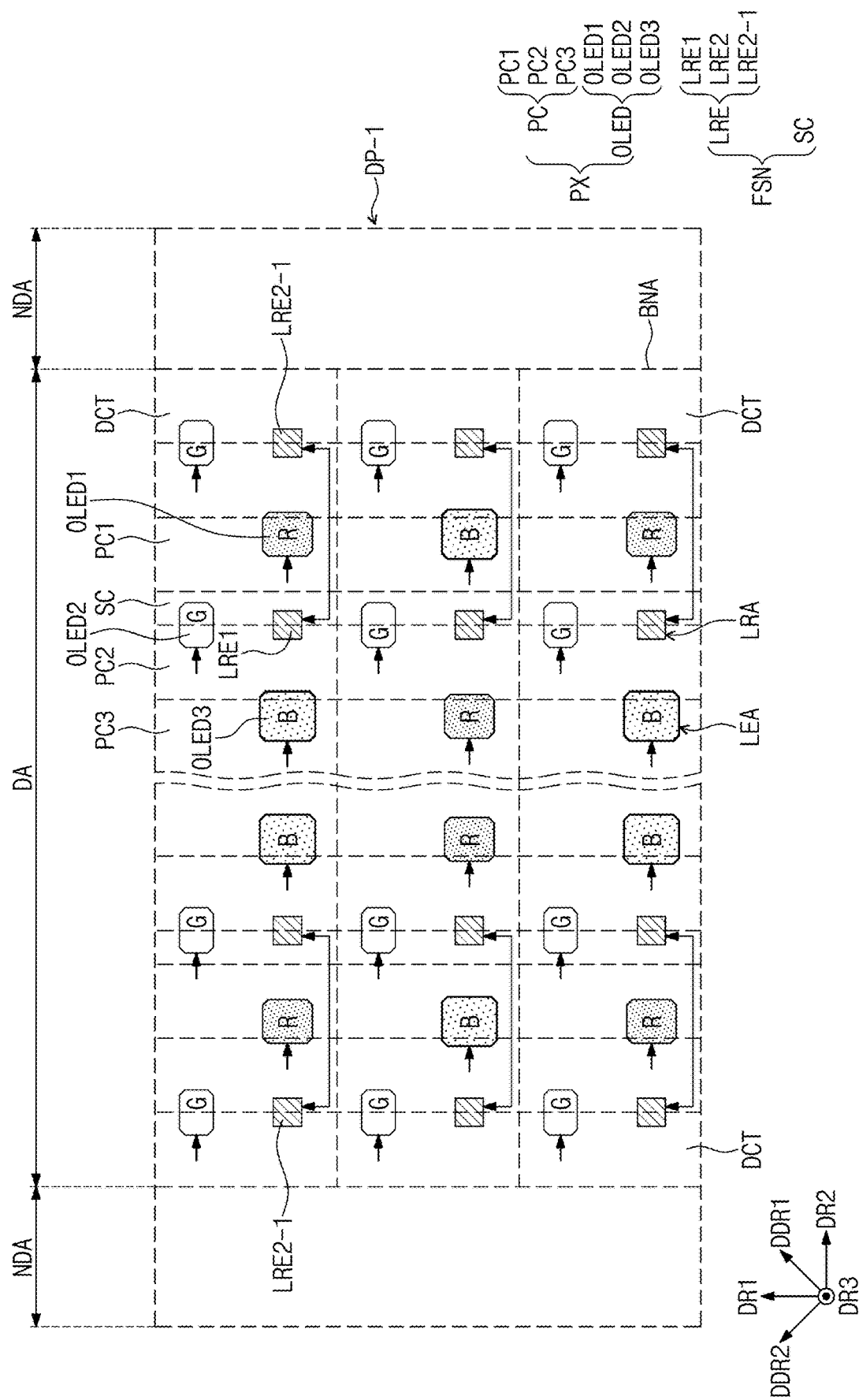
FIG. 25 is a schematic diagram showing a planar configuration of a display panel according to an example of the present invention.

FIG. 25 is a schematic diagram showing a planar configuration of a display panel according to an example of the present invention.

FIG. 25 depicts, by way of example, a plan view that corresponds to that of FIG. 13. The following configuration of a display panel DP-1 depicted in FIG. 25 will focus on differences from the display panel DP shown in FIG. 13.

Referring to FIG. 25, when viewed in the second direction DR2, the display panel DP-1 may have a symmetric structure in left and right sides thereof. The first, second, and third light emitting elements OLED1, OLED2, and OLED3 may be symmetrically disposed on left and right sides of the display panel DP-1, and the first and second light receiving elements LRE1 and LRE2-1 may be symmetrically disposed on left and right sides of the display panel DP-1.

The first, second, and third pixel circuits PC1, PC2, and PC3 may be symmetrically disposed on left and right sides of the display panel DP-1, and the sensing circuits SC may be symmetrically disposed on left and right sides of the display panel DP-1.

The dummy circuit patterns DCT may be disposed adjacent to opposite sides of the display area DA that are opposite to each other in the second direction DR2. The dummy circuit patterns DCT may cause an increase in sensing uniformity of the fingerprint sensors FSN.

According to an embodiment of the present invention, a pixel circuit below a light emitting element may be disposed adjacent to a first light receiving element in a display area, and a dummy circuit pattern whose pattern is similar to that of the pixel circuit may be disposed below a second light receiving element adjacent to a boundary between the display area and a non-display area. In this case, parasitic capacitors that affect the first and second light receiving elements may be formed similarly to each other by the pixel circuit and the dummy circuit pattern, and thus it may be possible to induce an increase in sensing uniformity of fingerprint sensors including the first and second light receiving elements.

Although the present invention is described in conjunction with some embodiments thereof, it would be understood by those skilled in the art that the present invention can be modified or changed in various ways without departing from spirit and scope of the present disclosure.

What is claimed is:

1. A display device, comprising:
   a light emitting element;
   a pixel circuit disposed below the light emitting element and electrically connected to the light emitting element;
   a first light receiving element disposed adjacent to the light emitting element;
   a sensing circuit disposed below the first light receiving element and electrically connected to the first light receiving element;
   a second light receiving element spaced apart from the first light receiving element and electrically connected to the sensing circuit, the second light receiving element being adjacent to the light emitting element; and
   a dummy circuit pattern disposed below the second light receiving element, overlapping the light emitting element,
   wherein the display device further includes a display area configured to display an image and a non-display area adjacent to the display area and configured to display no image, and the light emitting element, the first light receiving element, the second light receiving element, the sensing circuit, and the dummy circuit pattern are each disposed within the display area.

2. The display device of claim 1, wherein the dummy circuit pattern is not electrically connected to the second light receiving element.

3. The display device of claim 1, wherein the dummy circuit pattern receives a first voltage.

4. The display device of claim 1, wherein
   the second light receiving element and the dummy circuit pattern are adjacent to a boundary between the display area and the non-display area.

5. The display device of claim 4, wherein the light emitting element includes:
   a first light emitting element disposed between the first light receiving element and the second light receiving element, in a first direction; and
   a second light emitting element disposed adjacent to the boundary and spaced apart from the second light receiving element, in a second direction that intersects the first direction.

6. The display device of claim 5, wherein the dummy circuit pattern is disposed below the second light emitting element.

7. The display device of claim 5, wherein the dummy circuit pattern is not electrically connected to the second light emitting element.

8. The display device of claim 5, wherein the dummy circuit pattern partially overlaps the second light emitting element and the second light receiving element and is adjacent to the boundary.

9. The display device of claim 5, wherein the pixel circuit includes:
   a first pixel circuit disposed below the first light emitting element and electrically connected to the first light emitting element; and
   a second pixel circuit disposed below the second light emitting element and electrically connected to the second light emitting element.

10. The display device of claim 9, wherein the dummy circuit pattern is symmetric with respect to the second pixel circuit.

11. The display device of claim 9, wherein the second pixel circuit includes:
   a first semiconductor pattern;
   a first gate pattern disposed on the first semiconductor pattern;
   a second gate pattern disposed on the first gate pattern;
   a second semiconductor pattern disposed on the second gate pattern;
   a third gate pattern disposed on the second semiconductor pattern;
   a first connection pattern disposed on the third gate pattern; and
   a second connection pattern disposed on the first connection pattern.

12. The display device of claim 11, wherein the dummy circuit pattern includes:
   a first-first semiconductor pattern that is symmetric with respect to the first semiconductor pattern;
   a first-first gate pattern disposed on the first-first semiconductor pattern and symmetric with respect to the first gate pattern;
   a second-first gate pattern disposed on the first-first gate pattern and corresponding to the second gate pattern;
   a second-first semiconductor pattern disposed on the second-first gate pattern and symmetric with respect to the second semiconductor pattern; and
   a third-first gate pattern disposed on the second-first semiconductor pattern and symmetric with respect to the third gate pattern.

13. The display device of claim 11, wherein the dummy circuit pattern includes:
   a first-first connection pattern at a same level as the first connection pattern and symmetric with respect to the first connection pattern; and
   a second-first connection pattern at a same level as the second connection pattern and symmetric with respect to the second connection pattern.

14. The display device of claim 13, wherein the second connection pattern includes a power line and a data line,
   wherein the second-first connection pattern includes:
      a dummy power line symmetric with respect to the power line; and
      a dummy data line symmetric with respect to the data line.

15. The display device of claim 14, wherein a portion of the dummy data line extends toward the dummy power line and is integrally formed with the dummy power line.

16. The display device of claim 4, wherein
   the light emitting element is provided in plural, and the plurality of light emitting elements are arranged in a first diagonal direction and a second diagonal direction that intersects the first diagonal direction,
   the first light receiving element is disposed between the light emitting elements that are adjacent to each other in a first direction that intersects the first and second diagonal directions and between the light emitting elements that are adjacent to each other in a second direction that intersects the first direction, and
   the second light receiving element is disposed between the light emitting elements that are adjacent to the boundary and adjacent to each other in the first direction.

17. The display device of claim 16, wherein the plurality of light emitting elements include a plurality of first, second, and third light emitting elements,
   wherein the light emitting elements that are adjacent to each other in the second direction include the first and third light emitting elements, and
   wherein the light emitting elements that are adjacent to each other in the first direction include the second light emitting elements.

18. The display device of claim 16, wherein
   the dummy circuit pattern is provided in plural, and
   the plurality of dummy circuit patterns are disposed adjacent to opposite sides of the display area, the opposite sides being opposite to each other in the second direction.

19. A display device, comprising:
   a light emitting element;
   a pixel circuit disposed below the light emitting element and electrically connected to the light emitting element;
   a first light receiving element disposed adjacent to the light emitting element;
   a sensing circuit disposed below the first light receiving element and electrically connected to the first light receiving element;
   a second light receiving element spaced apart from the first light receiving element and electrically connected to the sensing circuit, the second light receiving element being adjacent to the light emitting element; and
   a dummy circuit pattern disposed below the second light receiving element, overlapping the light emitting element, and not electrically connected to either the light emitting element, the first light receiving element, or the second light receiving element,
   wherein the display device further includes a display area configured to display an image and a non-display area adjacent to the display area and configured to display no image, and the light emitting element, the first light receiving element, the second light receiving element, the sensing circuit, and the dummy circuit pattern are each disposed within the display area.

20. An electronic device including a display device, the display device, comprising:
   a light emitting element disposed on a display area configured to display an image;
   a pixel circuit disposed below the light emitting element and electrically connected to the light emitting element;
   a first light receiving element disposed on the display area;
   a sensing circuit disposed on the display area, below the first light receiving element and electrically connected to the first light receiving element;
   a second light receiving element that is spaced apart from the first light receiving element and is electrically connected to the sensing circuit and is disposed on the display area, adjacent to a boundary between the display area and a non-display area that is configured to display no image, proximate to the display area; and a dummy circuit pattern disposed on the display area, overlapping the light emitting element, below the second light receiving element,
wherein the dummy circuit pattern is symmetric with respect to the pixel circuit.

\* \* \* \* \*